US008820495B2

(12) United States Patent
King

(10) Patent No.: US 8,820,495 B2
(45) Date of Patent: Sep. 2, 2014

(54) ADJUSTABLE INTERNAL BYPASS SHOCK ABSORBER FEATURING A FLUID FLOW REGULATOR

(75) Inventor: Lance King, Garden Grove, CA (US)

(73) Assignee: King Shock Technology, Inc., Garden Grove, CA (US)

(*) Notice: Subject to any disclaimer, the term of this patent is extended or adjusted under 35 U.S.C. 154(b) by 226 days.

(21) Appl. No.: 13/186,644

(22) Filed: Jul. 20, 2011

(65) Prior Publication Data

US 2012/0018264 A1  Jan. 26, 2012

Related U.S. Application Data

(60) Provisional application No. 61/366,455, filed on Jul. 21, 2010.

(51) Int. Cl.
*F16F 9/50* (2006.01)
*F16F 9/512* (2006.01)
*F16F 9/348* (2006.01)
*F16F 9/48* (2006.01)

(52) U.S. Cl.
CPC ............... *F16F 9/348* (2013.01); *F16F 9/512* (2013.01); *F16F 9/486* (2013.01)
USPC ................. 188/282.5; 188/289; 188/322.15

(58) Field of Classification Search
CPC ............ F16F 9/063; F16F 9/16; F16F 9/182; F16F 9/19; F16F 9/3482
USPC ............. 188/282.1, 282.4–282.6, 282.9, 284, 188/289, 322.15
See application file for complete search history.

(56) References Cited

U.S. PATENT DOCUMENTS

| | | | | |
|---|---|---|---|---|
| 4,826,207 A * | 5/1989 | Yoshioka et al. | ...... | 280/124.161 |
| 4,943,083 A * | 7/1990 | Groves et al. | ............. | 188/266.1 |
| 4,953,671 A * | 9/1990 | Imaizumi | .................. | 188/282.3 |
| 4,997,068 A * | 3/1991 | Ashiba | ....................... | 188/282.5 |
| 5,277,283 A | 1/1994 | Yamaoka et al. | | |
| 5,316,114 A * | 5/1994 | Furuya et al. | .............. | 188/266.4 |
| 5,324,066 A * | 6/1994 | Masamura et al. | ........ | 280/5.519 |
| 5,404,973 A * | 4/1995 | Katoh et al. | ............... | 188/282.1 |
| 5,664,649 A | 9/1997 | Thompson et al. | | |
| 5,911,290 A * | 6/1999 | Steed | ......................... | 188/282.4 |
| 5,988,330 A | 11/1999 | Morris | | |
| 5,996,746 A | 12/1999 | Turner et al. | | |
| 6,085,877 A * | 7/2000 | Robinson et al. | ........ | 188/322.15 |
| 6,474,454 B2 * | 11/2002 | Matsumoto et al. | ....... | 188/282.6 |
| 6,668,986 B2 * | 12/2003 | Moradmand et al. | ......... | 188/267 |
| 6,782,980 B2 * | 8/2004 | Nakadate | ...................... | 188/313 |
| 6,860,370 B2 * | 3/2005 | Nakadate | .................. | 188/282.5 |
| 7,395,907 B2 * | 7/2008 | de Kock et al. | .......... | 188/322.15 |
| 2003/0173168 A1 * | 9/2003 | Gotz et al. | .................... | 188/289 |

\* cited by examiner

*Primary Examiner* — Thomas Irvin
(74) *Attorney, Agent, or Firm* — Loza & Loza, LLP; Razmig Messerian

(57) ABSTRACT

In one embodiment, an internal bypass shock absorber is disclosed whose compression and rebound resistance can be independently adjusted and is position dependent. The shock absorber features a fluid flow regulator coupled to a hollow chamber opening of a partially hollow piston rod. The fluid flow regulator may also feature a plurality of compression orifices and rebound orifices, and a compression valve stack and rebound valve stack each having one or more deflection discs. The number, diameter, and thickness of the deflection discs of the stacks can be adjusted to independently control compression and rebound resistance by controlling the flow of fluid between the first and second chambers of the cylinder housing of the shock absorber. The shock absorber may also have a tapered needle that controls the position at which the shock exhibits its maximum resistance.

23 Claims, 23 Drawing Sheets

ADJUSTABLE INTERNAL BYPASS SHOCK ABSORBER FEATURING A FLUID FLOW REGULATOR

CLAIM OF PRIORITY

The present application for patent claims priority to Provisional Application No. 61/366,455 entitled "Adjustable Internal Bypass Shock Absorber Featuring A Supplemental Piston" filed Jul. 21, 2010, the entire disclosure of which is hereby expressly incorporated by reference.

BACKGROUND

1. Field

Various embodiments of the present disclosure pertain generally to shock absorbers for vehicles. Specifically, the disclosure pertains to position dependent, internal bypass shock absorbers that allow for independent adjustment of shock absorber resistance in both compression and rebound phases.

2. Background

Generally, suspension springs of a vehicle support the weight of the vehicle and its load, and absorb road shocks. Shock absorbers help control or dampen spring action to avoid spring oscillation and assist in maintaining control of the vehicle, and as a result, are also referred to as "dampers." When a vehicle moves over a bump in the road, the wheel accordingly responds by moving up with the bump, and then back down after having passed the bump. As the vehicle moves over the bump, the spring and shock absorber compress since the wheel moves up toward the "sprung weight" of the vehicle in a phase referred to as "compression." After passing the bump, the spring and shock absorber extend out in the opposite direction in a phase referred to as "rebound." A correctly designed spring and shock absorber system goes through a small degree of oscillation in return to its steady state condition.

Ideally, the shock absorber will not only control oscillation, but also prevent the spring from achieving either full compression or full extension. Full compression indicates that the vehicle's suspension system is "bottomed out." Bottoming out may damage the spring and/or shock absorber. Full extension means that the vehicle's suspension system is "floating," and possibly no longer in contact with the road. Thus, a well designed spring/shock absorber system allows the vehicle chassis to remain relatively steady, and keeps the tires in contact with the ground despite bumps or holes in the road, and/or forces caused by cornering or changes in the vehicle's speed.

In high performance applications, such as off-road applications, and/or off-road racing, the springs and shock absorbers are considered one of the more important tunable systems on the vehicle, and one that can greatly affect the vehicle's handling characteristics. Indeed, adjusting the shock absorber characteristics can dramatically affect the way the off-road vehicle performs when it drives over uneven terrain, turns a corner, accelerates, and/or brakes.

Most shock absorbers include an oil-filled cylinder or tube in which a single piston moves up and down in response to movement of the wheel relative to the vehicle chassis. The piston typically divides the cylinder into upper and lower fluid chambers. The movement of the piston forces oil or hydraulic fluid in the cylinder to flow through small fluid passages or channels in the piston. The channels in the piston may be restricted by spring-loaded check valves or deflection discs that deflect under pressure. The resulting fluid friction limits both compression and rebound. The more easily the fluid flows through the channels, the softer the ride. In contrast, smaller channels and stiffer check valves or deflection discs, have greater restriction and provide a stiffer ride. Thus, varying the size of the channels, or the stiffness of the valves or deflection discs, alters the rebound and compression characteristics of the spring/damper system, and changes the ride characteristics of the vehicle. For high performance applications, such adjustability is greatly desired, particularly if the rebound and compression settings can be independently changed in a variety of ways.

Prior art shock absorbers typically provide limited means by which the rebound and compression characteristics can be adjusted. For example, a shock absorber with a single piston will typically provide limited internal bypass chambers for fluid flow. Accordingly, the number and location of the check valves and/or deflection discs that fit over the orifices of these internal bypass chambers are inherently limited.

For example, FIGS. 1 and 2 illustrate sectional views of a shock absorber found in the prior art. The shock absorber 100 comprises a fluid filled cylindrical housing 102 that slidably retains a piston 104. The piston 104 is coupled to one end of a piston rod 106. The piston 104 divides the housing 102 into an upper fluid chamber 108 and a lower fluid chamber 110. An opposing end (not shown) of the piston rod 106 extends out beyond the housing 102. During compression, the piston rod 106 is pushed/forced within the housing 102 in a direction toward the top end 112 of the shock absorber 100. During rebound, the piston rod 106 is pulled/forced within the housing 102 in a direction away from the top end 112 of the shock absorber 100.

FIG. 1 depicts the shock absorber 100 undergoing compression since the piston rod 106 and piston 104 are moving in a direction toward the top end 112 of the shock 100 (as indicated by the large, single arrow at the bottom of FIG. 1). During compression, fluid from the upper fluid chamber 108 is forced past channels in the piston 104 and flows into the lower fluid chamber 110 (as indicated by the smaller curved arrows). During rebound, fluid from the lower fluid chamber 110 is forced past different channels in the piston 104 and flows into the upper fluid chamber 108. The force required to move the fluid between the two fluid chambers 108, 110 gives the shock absorber, in part, its compression and rebound resistance.

FIG. 2 illustrates a detailed view of components that may comprise the piston 104. For example, the piston 104 may include a plurality of compression channels 202 that are sized and located so that they can be covered by stacks of washers or deflection discs forming valves on each side of the piston 104. Specifically, the compression channels 202 have entrance openings 204 and exit openings 206 that allow for the flow of fluid from the upper fluid chamber 108 to the lower fluid chamber 110. A compression valve deflection disc stack 208 (also referred to herein as a "compression valve stack") sits flush against the exit openings 206. The compression valve stack 208 is comprised of a plurality of washers or deflection discs that bend/deflect under fluid forces experienced during compression. A rebound valve deflection disc stack 210 (also referred to herein as a "rebound valve stack") sits flush against the entrance openings 204. The rebound valve stack 210 is comprised of a plurality of washers or discs that bend/deflect under fluid forces experienced during rebound. The entrance openings 204 are sized such that the rebound valve stack 210 does not entirely cover the entrance openings 204. By contrast, the compression valve stack 208 may completely cover the exit openings 206.

During the compression phase, fluid flows around the deflection discs of the rebound valve stack 210 and through the entrance openings 204. The pressure of the fluid inside the compression channels 202 pushing against the compression valve stack 208 causes the deflection discs of the compression valve stack 208 to elastically bend, thereby allowing fluid to flow out of the exit openings 206 and into the lower fluid chamber 110. During the rebound phase, the compression valve stack 208 stays closed and prevents fluid in the lower fluid chamber 110 from entering back into the compression channels 202 through the exit openings 206. Rather, rebound channels (not shown in FIG. 2) with entrance and exit openings similar in design are oriented in an opposite direction to allow fluid to flow from the lower fluid chamber 110 to the upper fluid chamber 108 in a relatively similar manner. Such prior art shock absorber offer limited means by which a user can adjust/tune the compression and/or rebound resistance characteristics of the shock absorber.

"External bypass" shock absorbers having external bypass chambers may provide additional means for adjusting rebound and compression resistance characteristics. However, external bypass shock absorbers can be large and unwieldy due to the additional cylinders that lie external to the main shock absorber cylinder. Such shocks may not be appropriate for some applications due space constraints in the wheel well, and/or the cost of additional cylinders and associated material. There exists a need for an internal bypass shock absorber that allows adjustability of the rebound and compression resistance characteristics in a variety of ways, that is also cost effective and not cumbersome.

SUMMARY

According to one embodiment, a shock absorber is disclosed, comprising: a housing; a piston slidably retained within the housing, the piston dividing the housing into a first fluid chamber and a second fluid chamber; a partially hollow piston rod coupled to the piston, the piston rod including a chamber orifice at a first end of the piston rod, the piston rod further including a hollow chamber having at least one hollow chamber opening; and a tunable fluid flow regulator coupled to the hollow piston rod at the hollow chamber opening, wherein the tunable fluid flow regulator is adjustable to change at least one of a rebound resistance or a compression resistance of the shock absorber by adjusting a rate of fluid flow between the hollow chamber of the piston rod and the second fluid chamber.

In one embodiment, the fluid flow regulator includes: at least one regulator compression orifice; and a regulator compression valve stack having at least one deflection disc that covers, at least partially, the regulator compression orifice, wherein the deflection disc of the regulator compression valve stack is adapted to deflect during compression to allow fluid to flow from an interior cavity of the fluid flow regulator into the second fluid chamber. In another embodiment, the fluid flow regulator includes: at least one regulator rebound orifice; and a regulator rebound valve stack having at least one deflection disc that covers, at least partially, the regulator rebound orifice, wherein the deflection disc of the regulator rebound valve stack is adapted to deflect during rebound to allow fluid to flow from the second fluid chamber into an interior cavity of the fluid flow regulator. At least one of a number, diameter, or thickness of the deflection disc of the regulator compression valve stack and/or the regulator rebound valve stack is adjustable to change the compression resistance of the shock absorber.

In one embodiment, the fluid flow regulator includes at least one primary opening that is in fluid flow connection with the hollow chamber opening. The fluid flow regulator may also includes: a main body; and a cover plate that is removably coupled to the main body. The main body may include: at least one of a regulator compression orifice or a regulator rebound orifice; a valve stack including at least one deflectable disc contained within an interior cavity of the main body, the valve stack covering, at least partially, the regulator compression orifice or the regulator rebound orifice; and a central support structure contained within the interior cavity that supports the valve stack. The central support structure may be tapered such that a base of the central support structure is thicker than a top portion of the central support structure, and the top portion of the central support structure is in contact with the valve stack. At least one of a number, diameter, or thickness of the deflection disc of the valve stack is adjustable to change the rebound resistance or compression resistance of the shock absorber, and removal of the cover plate provides access to make adjustments to the valve stack.

In another embodiment, the cover plate includes at least one of a regulator compression orifice or a regulator rebound orifice. The fluid flow regulator may also includes at least one bleed hole that allows fluid to flow into an interior cavity of the fluid flow regulator from the second fluid chamber. The regulator compression valve stack may be positioned flush against an exterior surface of the fluid flow regulator. In one embodiment, the fluid flow regulator is adjustable to independently change the rebound resistance or the compression resistance of the shock absorber, such that adjusting the fluid flow regulator to change the rebound resistance of the shock absorber does not affect the compression resistance of the shock absorber, and adjusting the fluid flow regulator to change the compression resistance of the shock absorber does not affect the rebound resistance of the shock absorber.

In one embodiment, the fluid flow regulator includes: a main body having an interior cavity; a cover plate that is removably coupled to the main body, the cover plate including at least one regulator compression channel and at least one regulator rebound channel; a first valve stack including at least one deflection disc, the first valve stack positioned on a first side of the cover plate within the interior cavity of the main body; and a second valve stack including at least one deflection disc positioned on a second side of the cover plate, the second side opposite to the first side of the cover plate, the second valve stack further positioned outside the interior cavity.

In another embodiment, the fluid flow regulator includes: at least one regulator compression orifice; and a check valve assembly that covers, at least partially, the regulator compression orifice, wherein the check valve assembly is adapted to be forced open under fluid pressure and allow fluid to flow from an interior cavity of the fluid flow regulator into the second fluid chamber. In one embodiment, the shock absorber further comprises a needle having a tapered end, the needle adapted to enter the chamber orifice of the piston rod.

According to another embodiment, a shock absorber is disclosed herein that comprises a housing; a piston slidably retained within the housing, the piston dividing the housing into a first fluid chamber and a second fluid chamber; a partially hollow piston rod coupled to the piston, the piston rod including a chamber orifice at a first end of the piston rod, the piston rod further including a hollow chamber having at least one hollow chamber opening adapted to allow fluid flow into or out of the hollow chamber; and means for regulating fluid flow between the hollow chamber of the piston rod and the second fluid chamber, wherein the means for regulating fluid flow is adjustable to change at least one of a rebound resistance or a compression resistance of the shock absorber.

According to another embodiment, a fluid flow regulator for a shock absorber is disclosed where the fluid flow regulator comprises: at least one regulator compression orifice; at least one regulator rebound orifice; a means for covering the regulator compression orifice, wherein the means for covering the regulator compression orifice is adapted to regulate fluid flow through the regulator compression orifice when the shock absorber is undergoing compression, and thereby control fluid flow between a hollow chamber of a piston rod and a first fluid chamber of the shock absorber during compression; and a means for covering the regulator rebound orifice, wherein the means for covering the regulator rebound orifice is adapted to regulate fluid flow through the regulator rebound orifice when the shock absorber is undergoing rebound, and thereby control fluid flow between the hollow chamber of a piston rod and a second fluid chamber of the shock absorber during rebound. In one embodiment, the means for covering the regulator compression orifice is adjustable to change a compression resistance characteristic of the shock absorber, and the means for covering the regulator rebound orifice is adjustable to change a rebound resistance characteristic of the shock absorber.

BRIEF DESCRIPTION OF THE DRAWINGS

FIG. 4 illustrates the shock absorber undergoing compression where the piston and the fluid flow regulator are at a position within the housing where the tapered needle end is outside the hollow chamber of the piston rod.

FIG. 5 illustrates the shock absorber undergoing compression where the piston and the fluid flow regulator are at a position within the housing where the tapered needle end has partially entered the hollow chamber of the piston rod.

FIG. 6 illustrates the shock absorber undergoing compression where the piston and the fluid flow regulator are at a position within the housing where the tapered needle end has completed entered the hollow chamber of the piston rod.

FIG. 8 illustrates the shock absorber undergoing rebound where the piston and the fluid flow regulator are at a position within the housing where the tapered needle end is outside the hollow chamber of the piston rod.

FIG. 9 illustrates the shock absorber undergoing rebound where the piston and the fluid flow regulator are at a position within the housing where the tapered needle end has partially entered the hollow chamber of the piston rod.

FIG. 10 illustrates the shock absorber undergoing rebound where the piston and the fluid flow regulator are at a position within the housing where the tapered needle end has completed entered the hollow chamber of the piston rod.

DETAILED DESCRIPTION

Figure 1:
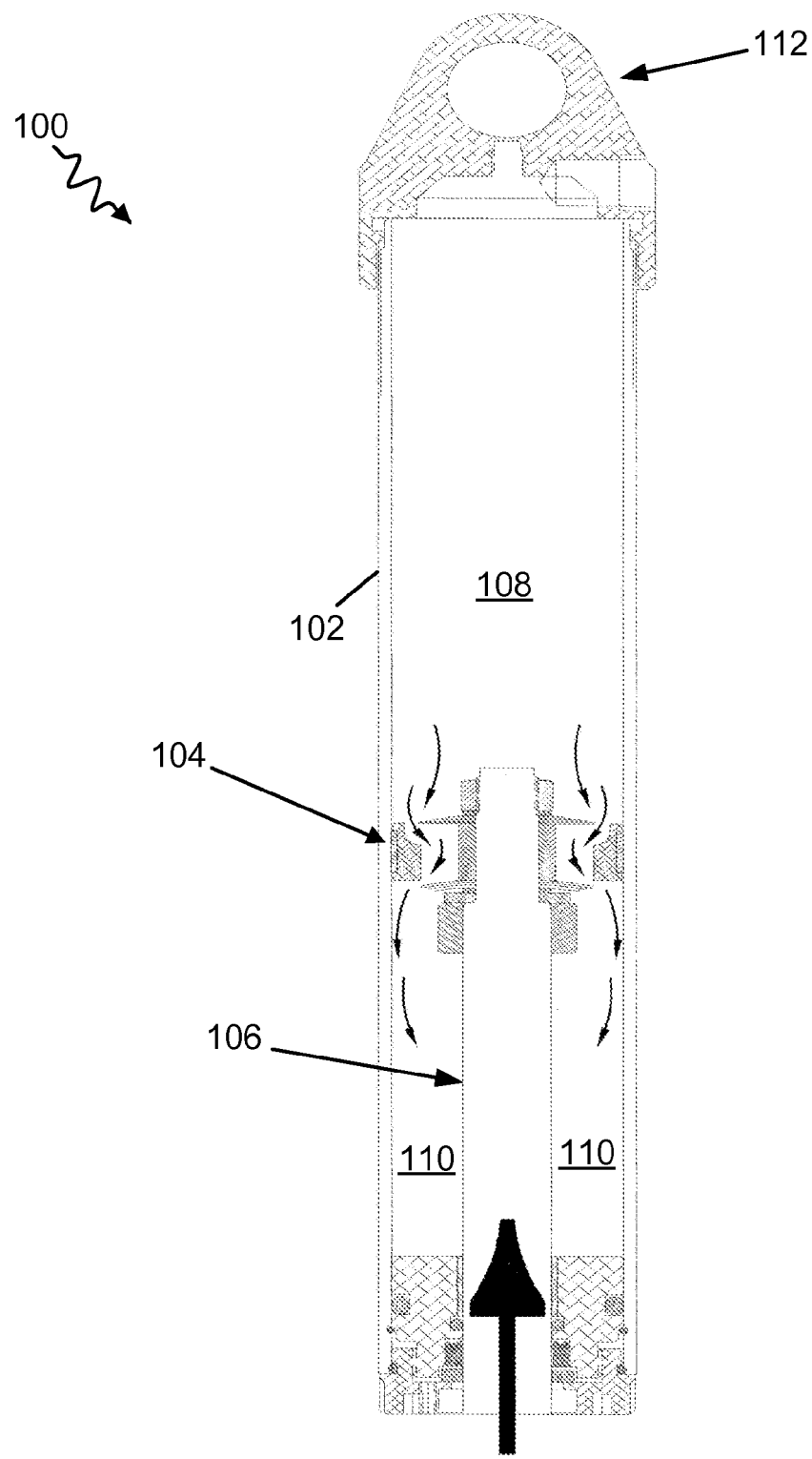
FIGS. 1 and 2 illustrate sectional views of a shock absorber found in the prior art.
Figure 2:
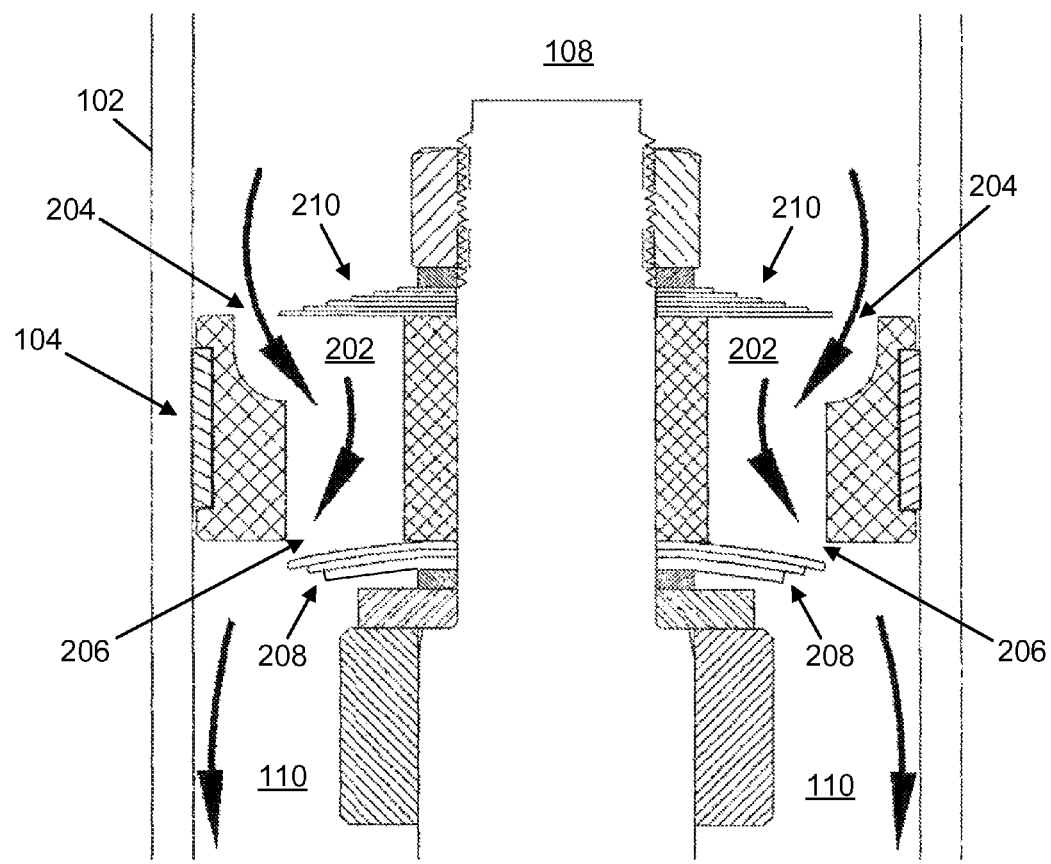

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

In the following description, certain terminology is used to describe certain features of one or more embodiments of the invention. For example, the terms "shock absorber(s)," "damper(s)," and "shock(s)" all imply a shock absorber fit for a vehicle, and are interchangeable with one another. Moreover, the terms "rebound phase" and "rebound" are also interchangeable, as are "compression phase" and "compression." The word "exemplary" as used herein merely means "serving as just one example or illustration." It is not meant to limit any device, method, or apparatus to that one particular example or illustration.

Overview

An internal bypass shock absorber featuring a fluid flow regulator is disclosed herein. The shock absorber features a partially hollow piston rod through which fluid may flow back and forth between an upper fluid chamber and a lower fluid chamber of the shock absorber. Fluid flow through the hollow piston rod may be controlled, adjusted, and tuned using a fluid flow regulator. The fluid flow regulator allows a user to adjust features of the regulator in order to change the compression and/or rebound resistance characteristics to a desired setting. For example, in one embodiment, the number, size, thickness, or type of deflection discs associated with the fluid flow regulator may be changed or modified to achieve the desired compression and/or rebound resistance characteristics. As another example, orifices and openings associated with the fluid flow regulator may be modified in number, size, and/or shape to achieve the desired compression and/or rebound resistance characteristics.

These additional means for adjustability give the user more control over how to alter the compression and rebound resistance characteristics of the shock absorber because the fluid flow through the hollow piston rod is not permanently fixed, but instead is tunable. The fluid flow regulator may be adjustable to independently change the rebound resistance or the compression resistance of the shock absorber, such that adjusting the fluid flow regulator to change the rebound resistance of the shock absorber does not affect the compression resistance of the shock absorber, and adjusting the fluid flow regulator to change the compression resistance of the shock absorber does not affect the rebound resistance of the shock absorber.

Moreover, the mono-tube design of the shock absorbers disclosed herein help dissipate heat better than multi-tube designs. Moreover, the mono-tube design of the shock absorbers disclosed herein may be easier to manufacture and cost less than multi-tube designs because less material and parts are needed. Additionally, some embodiments herein disclose fluid flow regulators that utilize deflection disc valve stacks that offer variable dampening resistance that varies depending on the amount of compression and/or rebound forces experienced by the shock absorber in real time. By contrast, other shock absorbers that utilize fixed, non-variable orifice dampening (e.g., a fixed hole with no covering) do not vary dampening resistance based on the amount of compression and/or rebound force the shock is experiencing at any one time.

Exemplary Operation of Shock Absorber Featuring Fluid Flow Regulator

Figure 3A:
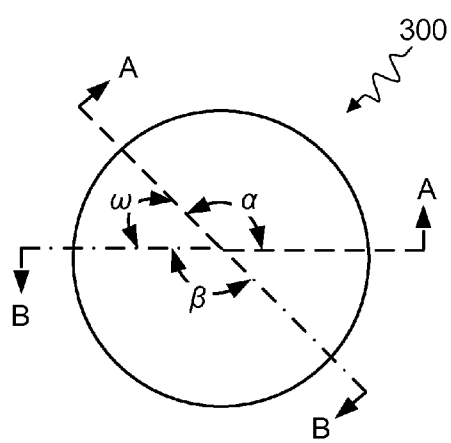
FIG. 3A illustrates a simplified top view of a shock absorber.

FIG. 3A illustrates a simplified top view of a cylindrically shaped shock absorber 300. FIGS. 3B and 4-6 are sectional views along the section lines A-A having an angle α approximately equal to 120° (degrees). However, in other embodiments the components shown in the sectional views of FIGS. 3B and 4-6 may be along section lines having any angle α that is between 30° (degrees) and 330° (degrees), including for example 90° (degrees) and 180° (degrees). FIGS. 7-10 are sectional views along the section lines B-B having an angle β approximately equal to 120° (degrees). However, in other embodiments the components shown in the sectional views of FIGS. 3B and 4-6 may be along section lines having any angle β between 30° (degrees) and 330° (degrees), including for example 90° (degrees) and 180° (degrees). In one embodiment, the angle ω between the section lines A-A and B-B is approximately 30° degrees.

FIGS. 3B and 4-6 illustrate sectional views of a shock absorber 300 according to one embodiment featuring a fluid flow regulator 314 during different stages of compression.

Figure 3B:
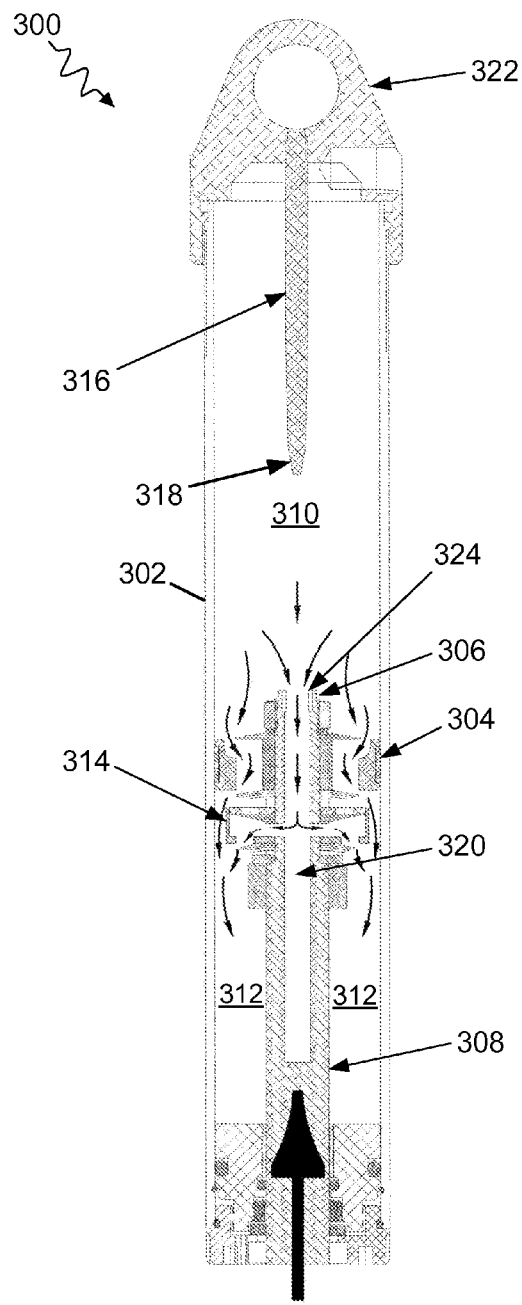
FIGS. 3B and 4-6 illustrate sectional views of a shock absorber featuring a fluid flow regulator according to one embodiment during the compression phase.

FIG. 3B illustrates a shock absorber 300 comprising a housing 302 that slidably retains a piston 304. In one embodiment, the housing 302 may be cylindrically shaped. The piston 304 may be coupled to a first end 306 (e.g., upper portion) of a partially hollow piston rod 308. The piston rod 308 also has an opposing second end (not shown in FIG. 3B) that extends outside the cylinder housing 302, and may, for example, couple to a location within the wheel well of a vehicle. The piston 304 divides the housing 302 into an upper fluid chamber (e.g., first fluid chamber) 310 and a lower fluid chamber (e.g., second fluid chamber) 312. During the compression phase, the piston rod 304 is pushed/forced within the housing 302 in a direction toward the top end 322 of the shock absorber 300 (as indicated by the large, single arrow at the bottom of FIG. 3B). The fluid from the upper fluid chamber 310 is forced past compression channels in the piston 304 before it flows into the lower fluid chamber 312 (as indicated by the smaller curved arrows).

The shock absorber 300 further comprises a fluid flow regulator 314 (also may be referred to herein as a "supplementary piston") that is coupled to the partially hollow piston rod 308. Specifically, the fluid flow regulator 314 is coupled at a point along the piston rod 308 where the piston rod 308 is hollow inside. The point along the piston rod 308 at which the fluid flow regulator 314 is coupled includes one or more hollow chamber openings that allow access to the interior of a hollow chamber 320 of the piston rod 308. The fluid flow regulator 314 may be located within the lower fluid chamber 312 and has a diameter less than the piston 304 in order to allow fluid to freely flow around the fluid flow regulator 314. Secured to the top portion of the cylinder housing 302 is a needle (e.g., metered rod) 316 having a tapered end 318 that extends toward the hollow chamber 320 of the piston rod 308. The needle 316 is configured to at least partially enter and fit inside the hollow chamber 320 of the piston rod 308. Depending on the location of the piston 304 within the housing 302, fluid from the upper fluid chamber 310 may enter the hollow chamber 320 of the piston rod 308 via a chamber orifice 324—located at the first end 306 of the piston rod 308—during compression. The thickness of the needle 316 (at a point excluding the tapered end 318) may be substantially equal to the diameter of the chamber orifice 324 so that when the tapered end 318 is fully inside the hollow chamber 320, fluid flow into the hollow chamber 320 is blocked by the needle 316.

Figure 4:
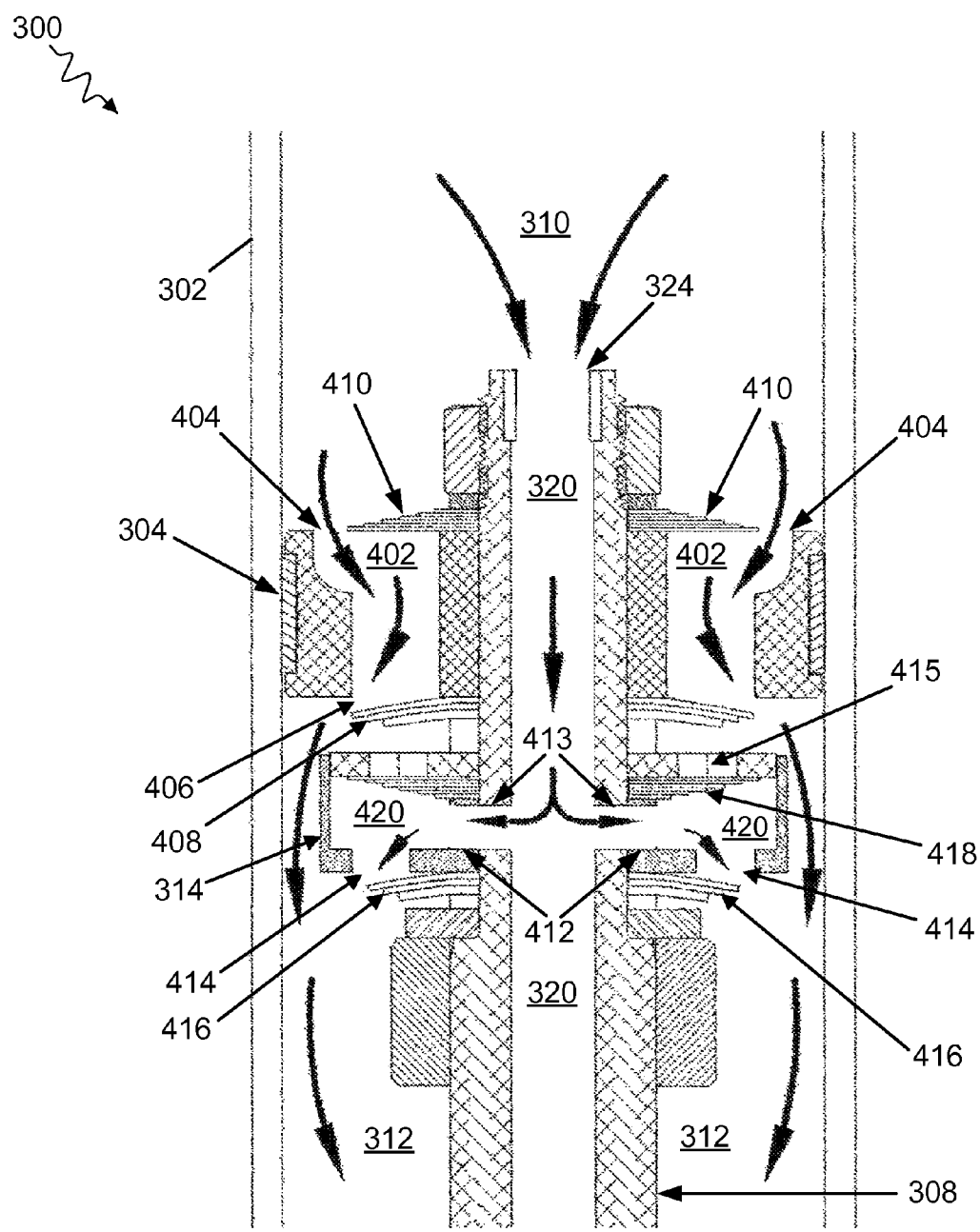
Figure 5:
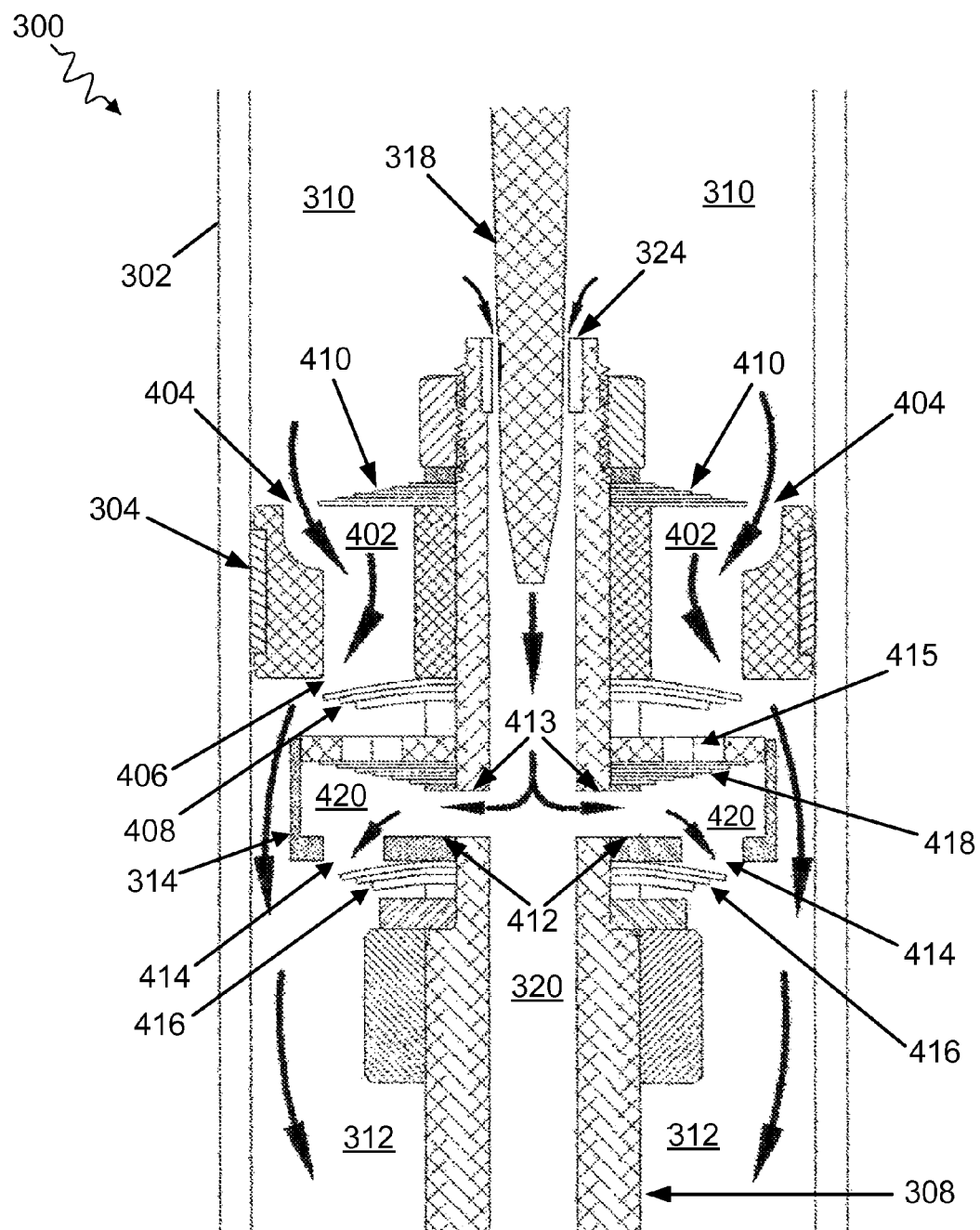
Figure 6:
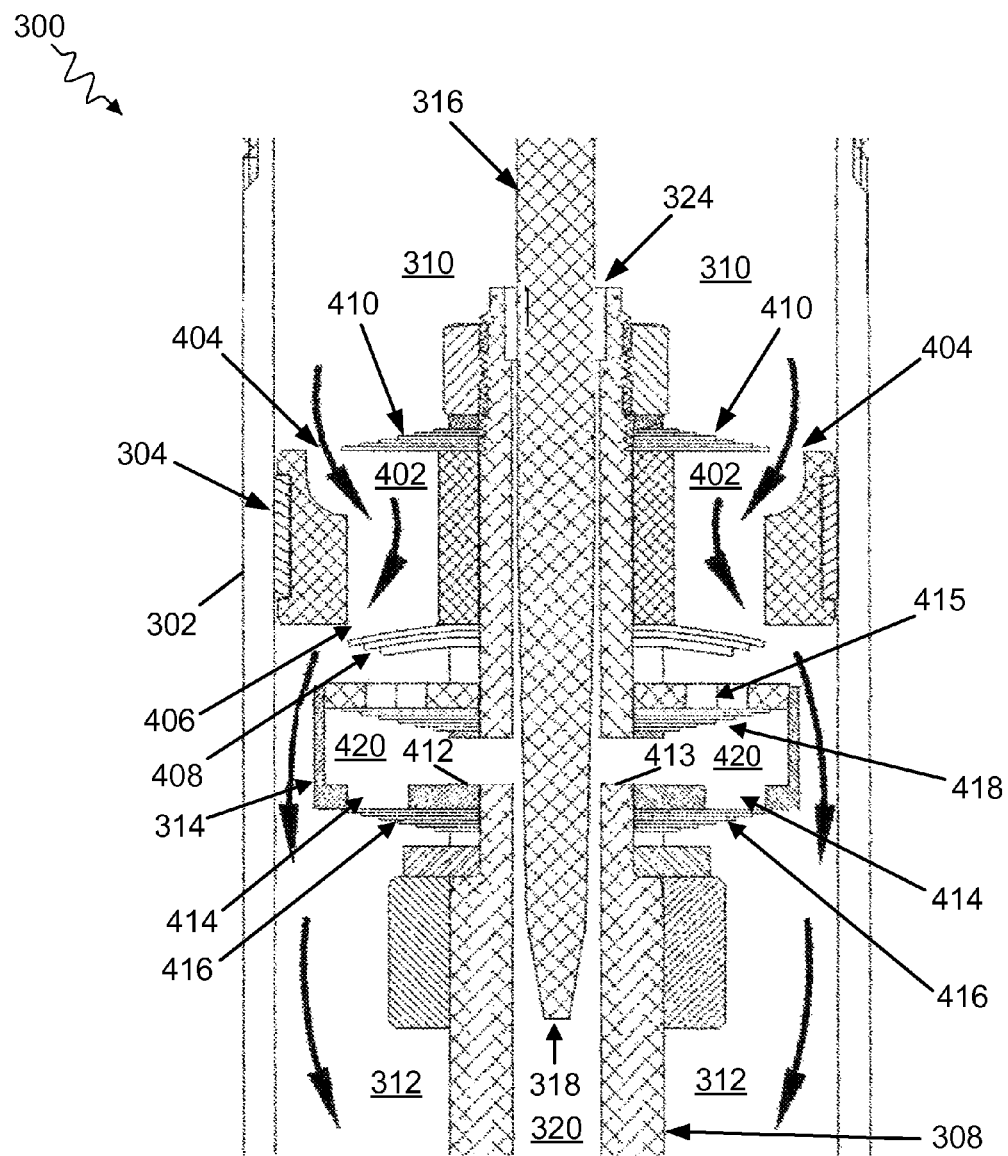

FIGS. 4-6 illustrate the piston 304 and the fluid flow regulator 314 at different positions within the housing 302 while the shock absorber 300 undergoes compression. For example, FIG. 4 illustrates the piston 304 and the fluid flow regulator 314 at a position within the housing 302 where the tapered needle end 318 is entirely outside the hollow chamber 320 of the piston rod 308. FIG. 5 illustrates the piston 304 and the fluid flow regulator 314 at a position within the housing 302 where the tapered needle end 318 is partially inside the hollow chamber 320 of the piston rod 308. FIG. 6 illustrates the piston 304 and the fluid flow regulator 314 at a position within the housing 302 where the tapered needle end 318 is entirely inside the hollow chamber 320 of the piston rod 308 such that the needle 316 prevents fluid from the upper fluid chamber 310 to flow into the hollow chamber 320.

Referring to FIG. 4, the piston 304 may comprise one or more compression channels 402 that are sized and located so that they can be covered—either entirely or partially—by a stack of washers or deflection discs that form valves on each side of the piston 304. The compression channels 402 have compression channel entrance openings 404 and compression channel exit openings 406 that allow fluid from the upper fluid chamber 310 to flow into the lower fluid chamber 312 (e.g., as indicated by the direction of the small curved arrows). A compression valve deflection disc stack 408 (also referred to herein as a "compression valve stack") sits flush against the exit openings 406. The compression valve stack 408 is comprised of one or more washers or deflection discs that bend/deflect under fluid forces experienced during compression. A rebound valve deflection disc stack (also referred to herein as a "rebound valve stack") 410 sits flush against the entrance openings 404. The rebound valve stack 410 is comprised of one or more washers or deflection discs that bend/deflect under fluid forces experienced during rebound. The entrance openings 404 are sized and shaped such that the rebound valve stack 210 does not entirely cover the entrance openings 404. By contrast, the compression valve stack 408 may completely cover the exit openings 406. The plurality of deflection discs of the rebound valve stack 410 and compression valve stack 408 may be adjusted in number, diameter, and thickness in order to vary resistance provided by the deflection discs during rebound and/or compression.

The fluid flow regulator 314 may comprise one or more primary openings 412, one or more regulator compression orifices 414 (also may be referred to herein as "supplementary compression orifices"), one or more regulator rebound orifices 415 (also may be referred to herein as "supplementary rebound orifices"), a regulator compression deflection disc valve stack 416 (also may be referred to herein as a "regulator compression valve stack," and "supplementary compression valve stack"), and a regulator rebound deflection disc valve stack 418 (also may be referred to herein as a "regulator rebound valve stack," and "supplementary rebound valve stack"). The supplementary compression orifices 414 allow fluid to flow from the upper fluid chamber 310 to the lower fluid chamber 312 via the hollow chamber 320 of the piston rod 308 during compression. The regulator rebound orifices 415 allow fluid to flow from the lower fluid chamber 312 to the upper fluid chamber 310 via the hollow chamber 320 of the piston rod 308 during rebound.

The primary openings 412 may be aligned, at least partially, with and couple to one or more hollow chamber openings 413 of the piston rod 308. The hollow chamber openings 413 are orifices along the hollow shaft of the piston rod 308 that allow access to the hollow chamber 320 inside the piston rod 308. Thus, when the primary openings 412 of the fluid flow regulator 314 are aligned, at least partially, with the hollow chamber openings 413 of the piston rod 308, fluid can flow back and forth between the hollow chamber 320 of the piston rod 308 and the interior cavity 420 of the fluid flow regulator 314.

The regulator compression valve stack 416 and the regulator rebound valve stack 418 are each comprised of one or more washers or deflection discs that bend/deflect under sufficient force. For example, the deflection discs of the regulator compression valve stack 416 bend/deflect under fluid forces experienced during compression. By contrast, the deflection discs of the regulator rebound valve stack 418 bend/deflect under fluid forces experienced during rebound. The number, thickness, diameter, and/or composition of these deflection discs can be changed depending on the desired resistances to be provided by the regulator compression valve stack 416 and the regulator rebound valve stack 418. In one embodiment, the regulator compression valve stack 416 sits flush against and covers the regulator compression orifices 414 along an exterior/bottom surface of the fluid flow regulator 314 (as shown in FIG. 4). In one embodiment, the regulator rebound valve stack 418 sits flush against and covers regulator rebound orifices 415 along an interior surface of the fluid flow regulator 314 (as shown in FIG. 4).

During compression, the fluid from the upper fluid chamber 310 flows around the deflection disks of the rebound valve stack 410 and through the compression channel entrance openings 404 of the piston 304. The pressure of the fluid inside the compression channels 402 pushing against the compression valve stack 408 causes the deflection discs of the compression valve stack 408 to elastically bend, thereby allowing fluid to flow out of the exit openings 406 and into the lower fluid chamber 312.

Moreover, since the needle 316 has not yet entered the hollow chamber 320 of the piston rod 308 during the compression stage shown in FIG. 4, fluid flow into the hollow chamber 320 via the chamber orifice 324 from the upper fluid chamber 310 is unimpeded by the needle 316. Thus, fluid from the upper fluid chamber 310 flows down through the hollow chamber 320 of the piston rod 308, through the hollow chamber openings 413 and primary openings 412, and into an interior cavity 420 (e.g., hollow interior region) of the fluid flow regulator 314. The pressure of the fluid within the fluid flow regulator 314 forces the deflection discs of the regulator compression valve stack 416 to bend/deflect open, thereby allowing fluid to flow out from the interior cavity 420 of the fluid flow regulator 314 and into the lower fluid chamber 312 via the regulator compression orifices 414. In one embodiment, fluid does not leak out through the regulator rebound orifices 415 during the compression phase because the hydrostatic pressure difference between the interior and exterior regions of the fluid flow regulator 314 keeps the regulator rebound valve stack 418 closed flush against the regulator rebound orifices 415 (i.e., the regulator rebound valve stack 418 completely covers the regulator rebound orifices 415).

FIG. 5 illustrates a stage during compression where the piston 304 and the fluid flow regulator 314 are positioned within the housing 302 such that the tapered needle end 318 of the needle 316 has partially entered the hollow chamber 320 of the piston rod 308 through the chamber orifice 324. During this stage of compression, fluid flows from the upper fluid chamber 310 into the hollow chamber 320 of the piston rod 308 at a reduced rate (compared to the compression stage shown in FIG. 4) because the chamber orifice 324 is partially blocked by the needle's tapered end 318. Since fluid flow into the hollow chamber 320 is reduced, fluid flow into the interior cavity 420 from the hollow chamber 320 via the hollow chamber openings 413 and primary openings 412, as well as fluid flow into the lower fluid chamber 312 from the interior cavity 420 via the regulator compression orifices 414 is also reduced. The overall reduced rate of fluid flow from the upper fluid chamber 310 into the lower fluid chamber 312 increases the compression resistance of the shock absorber 300.

Moreover, as the piston 304, the fluid flow regulator 314, and the piston rod 308 advance further toward the top end 322 of the shock absorber 300, the tapered needle end 318 progresses deeper into the hollow chamber 320 (i.e., it approaches the compression stage shown in FIG. 6). This further reduces fluid flow from the upper fluid chamber 310 into the lower fluid chamber 312, and increases compression resistance because of the chamber orifice 324 is further impeded by the increased thickness of the needle's tapered end 318 at the chamber orifice 324.

FIG. 6 illustrates a stage during compression where the piston 304 and the fluid flow regulator 314 are positioned within the housing 302 such that the tapered needle end 318 has completely entered the hollow chamber 320 of the piston rod 308. During this stage of compression, fluid from the upper fluid chamber 310 cannot flow into the hollow chamber 320 of the piston rod 308 because the chamber orifice 324 is blocked by the needle 316. Since fluid flow into the hollow chamber 320 has stopped, fluid does not flow through the hollow chamber openings 413 and the primary openings 412 nor does fluid flow through the regulator compression orifices 414. Instead, fluid flow from the upper fluid chamber 310 to the lower fluid chamber 312 during compression is restricted to only the amount flowing out through the exit openings 406 of the piston 304. In one embodiment, this stage of compression may offer the maximum compression resistance.

FIGS. 7-10 illustrate sectional views of the shock absorber 300 that illustrate one or more rebound channels used to control the flow of fluid within the housing 302 during a rebound phase. These figures also feature the fluid flow regulator 314 during different stages of rebound.

Figure 7:
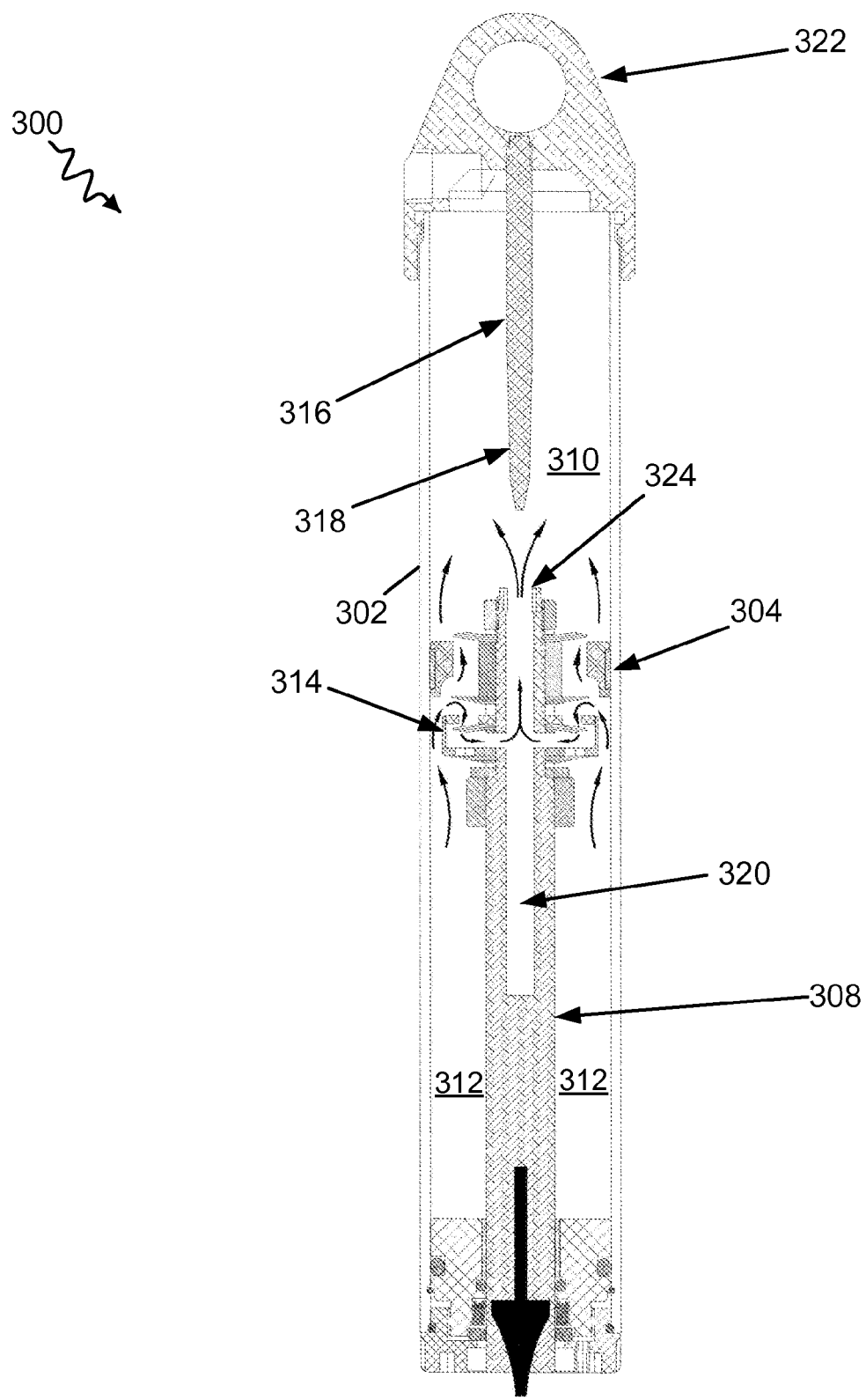
FIGS. 7-10 illustrate sectional views of the shock absorber featuring the fluid flow regulator during the rebound phase.

Referring to FIG. 7, the piston rod 304 is pulled/forced within the housing 302 in a direction away from the top end 322 of the shock absorber 300 during rebound (as indicated by the large, single arrow at the bottom of FIG. 7). The fluid from the lower fluid chamber 312 is forced past rebound channels in the piston 304 before the fluid flows into the upper fluid chamber 310 (as indicated by the smaller curved arrows). Depending on the location of the piston 304 within the housing 302, fluid from the hollow chamber 320 of the piston rod 308 may also flow into the upper fluid chamber 310 via the chamber orifice 324 during rebound. The thickness of the needle 316 (at a point excluding the tapered end 318) may be substantially equal to the diameter of the chamber orifice 324 so that when the tapered end 318 is fully inside the hollow chamber 320, fluid flow out of the hollow chamber 320 and into the upper fluid chamber 310 is blocked by the needle 316.

Figure 8:
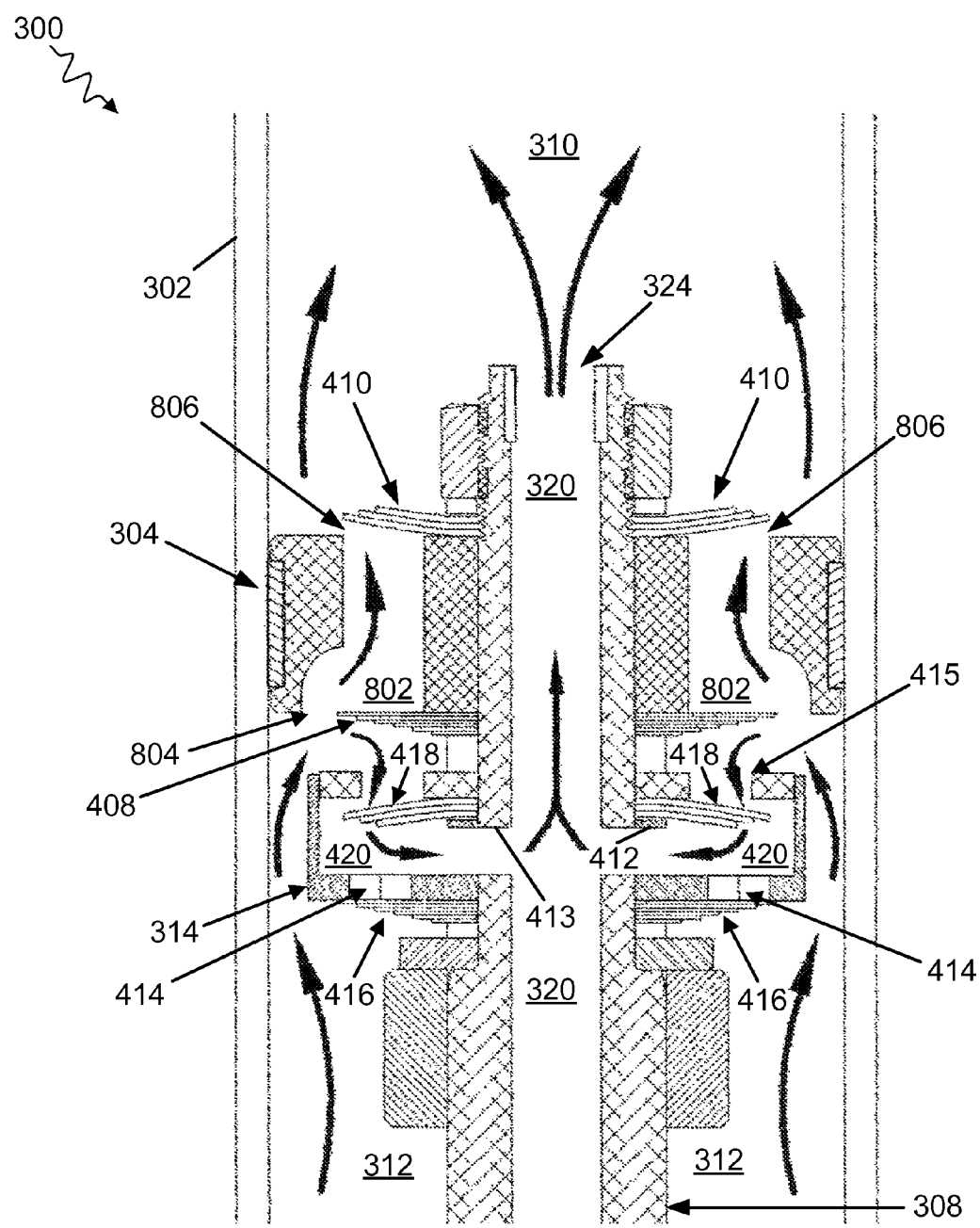
Figure 9:
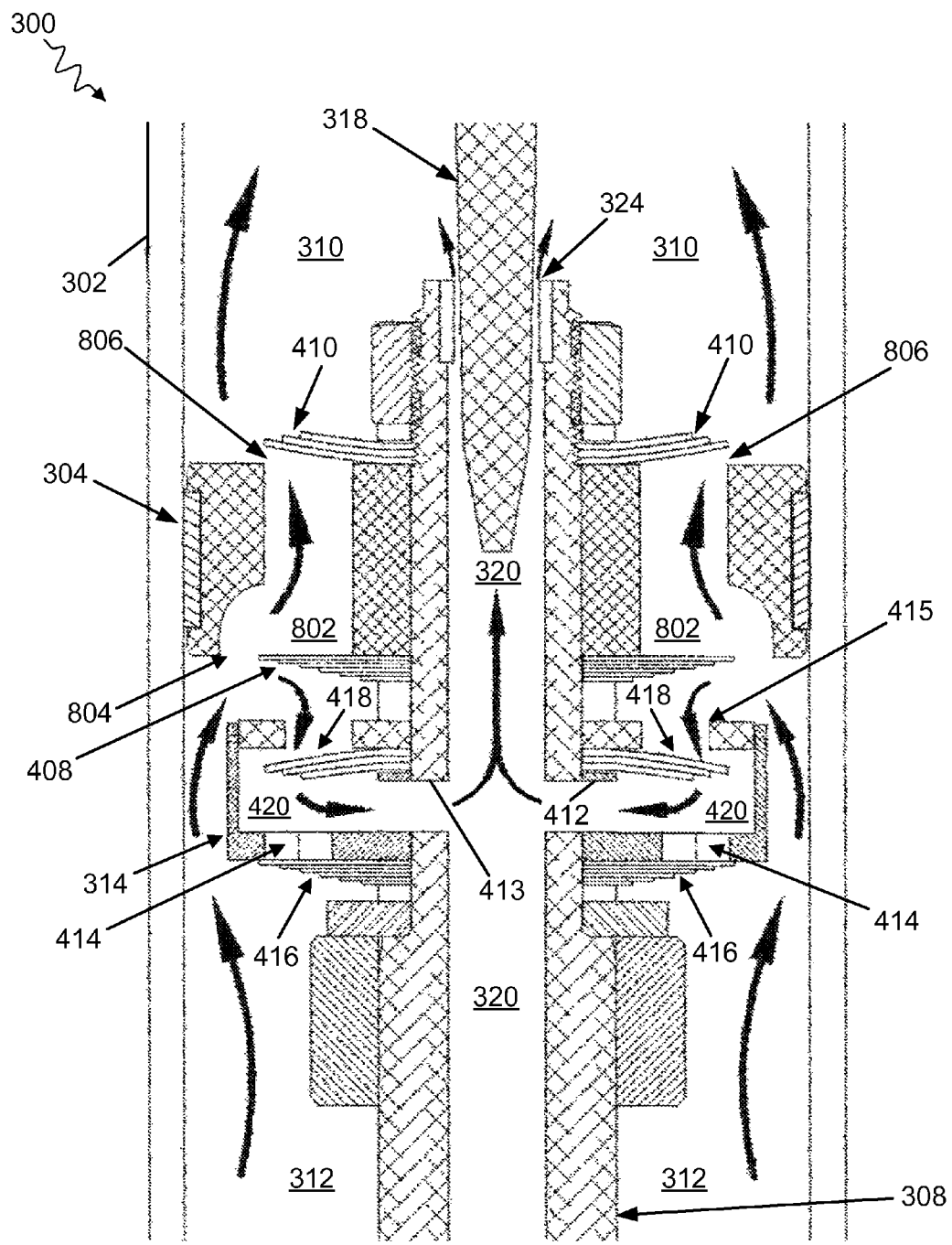
Figure 10:
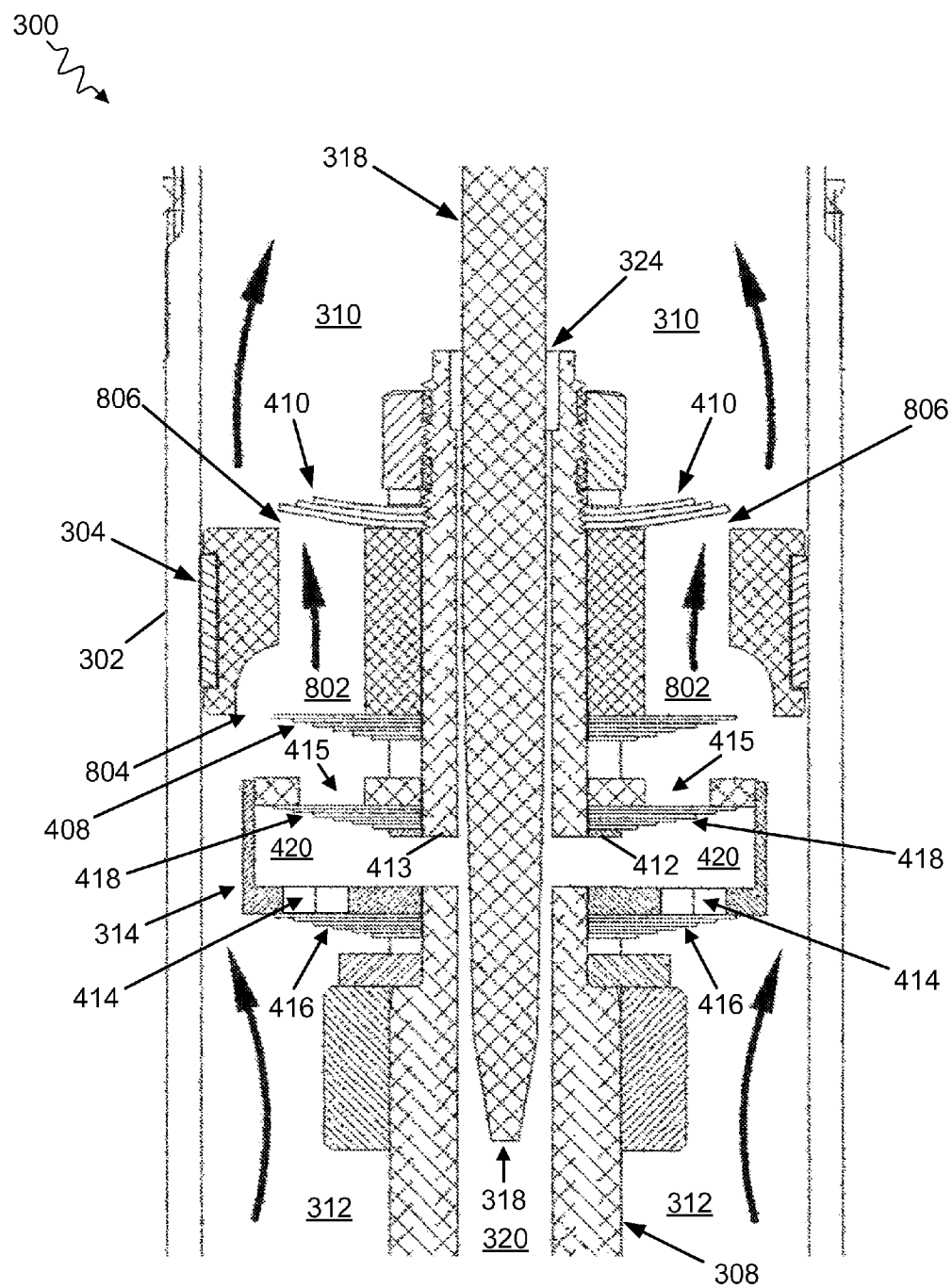

FIGS. 8-10 illustrate the piston 304 and the fluid flow regulator 314 at different positions within the housing 302 while the shock absorber 300 undergoes rebound. For example, FIG. 8 illustrates the piston 304 and the fluid flow regulator 314 at a position within the housing 302 where the tapered needle end 318 is entirely outside the hollow chamber 320 of the piston rod 308. FIG. 9 illustrates the piston 304 and the fluid flow regulator 314 at a position within the housing 302 where the tapered needle end 318 is partially inside the hollow chamber 320 of the piston rod 308. FIG. 10 illustrates the piston 304 and the fluid flow regulator 314 at a position within the housing 302 where the tapered needle end 318 is entirely inside the hollow chamber 320 of the piston rod 308 such that the needle 316 prevents fluid from the hollow chamber 320 to flow into the upper fluid chamber 310.

Referring to FIG. 8, the shock absorber 300 further comprises one or more rebound channels 802 that are sized and located so that they can be covered—either entirely or partially—by the stack of washers or deflection discs that form valves on each side of the piston 304. The rebound channels 802 have rebound channel entrance openings 804 and rebound channel exit openings 806 that allow for the flow of fluid from the lower fluid chamber 312 to the upper fluid chamber 310 (e.g., as indicated by the direction of the small curved arrows). The rebound valve stack 410 sits flush against the exit openings 806, and the compression valve stack sits flush against the entrance openings 804. The deflection discs of the rebound valve stack 410 bend/deflect under fluid forces experienced during rebound, whereas the deflection discs of the compression valve stack 408 bend/deflect under fluid forces experienced during compression. The entrance openings 804 are sized and shaped such that the compression valve stack 408 does not entirely cover the entrance openings 804. By contrast, the rebound valve stack 410 may completely cover the exit openings 806. The plurality of deflection discs of the rebound valve stack 410 and compression valve stack 408 may be adjusted in number, diameter, thickness, and/or composition in order to vary resistance provided by the deflection discs during rebound and/or compression.

During rebound, the fluid from the lower fluid chamber 312 flows around the deflection disks of the compression valve stack 408, and through the rebound channel entrance openings 804 of the piston 304. The pressure of the fluid inside the compression channels 802 pushing against the rebound valve stack 410 causes the deflection discs of the rebound valve stack 410 to elastically bend, thereby allowing fluid to flow out of the exit openings 806 and into the upper fluid chamber 310.

Moreover, since the needle 316 is located completely outside the hollow chamber 320 of the piston rod 308 during the rebound stage shown in FIG. 8, fluid flow out of the hollow chamber 320 via the chamber orifice 324 and into the upper fluid chamber 310 is unimpeded by the needle 316. Thus, fluid pressure within the lower fluid chamber 312 forces the deflection discs of the regulator rebound valve stack 418 to bend/deflect open, thereby allowing fluid to flow from the lower fluid chamber 312 into the interior cavity 420 of the fluid flow regulator 314 via the regulator rebound orifices 415. This causes fluid within the interior cavity 420 to flow through the primary openings 412 and the hollow chamber openings 413, then up through the hollow chamber 320 of the piston rod 308 and into the upper fluid chamber 310. In one embodiment, fluid does not leak out through the regulator compression orifices 414 during the rebound phase because the hydrostatic pressure difference between the interior and exterior regions of the fluid flow regulator 314 keeps the regulator compression valve stack 416 closed flush against the regulator compression orifices 414 (i.e., the regulator compression valve stack 416 completely covers the regulator compression orifices 414).

FIG. 9 illustrates a stage during rebound where the piston 304 and the fluid flow regulator 314 are positioned within the housing 302 such that the tapered needle end 318 of the needle 316 has partially entered the hollow chamber 320 of the piston rod 308 through the chamber orifice 324. During this stage of rebound, fluid flows from the hollow chamber 320 of the piston rod 308 and into the upper fluid chamber 310 at a reduced rate (compared to the rebound stage shown in FIG. 8) because the chamber orifice 324 is partially blocked by the needle's tapered end 318. Since fluid flow out of the hollow chamber 320 is reduced, fluid flow into the interior cavity 420 from the lower fluid chamber 312, as well as fluid flow into the hollow chamber 320 from the interior cavity 420 is also reduced. The overall reduced rate of fluid flow from the lower fluid chamber 312 into the upper fluid chamber 310 increases the rebound resistance of the shock absorber 300.

Moreover, as the piston 304, the fluid flow regulator 314, and the piston rod 308 advance further away from the top end 322 of the shock absorber 300, the tapered needle end 318 pulls out and away from the hollow chamber 320 (i.e., it approaches the rebound stage shown in FIG. 8). This action increases fluid flow from the lower fluid chamber 312 into the upper fluid chamber 310, and decreases rebound resistance because the chamber orifice 324 is less impeded by the needle 316 as the thickness of the needle's tapered end 318 at the chamber orifice 324 decreases.

FIG. 10 illustrates a stage during rebound where the piston 304 and the fluid flow regulator 314 are positioned within the housing 302 such that the tapered needle end 318 has completed entered the hollow chamber 320 of the piston rod 308. During this stage of rebound, fluid from the hollow chamber 320 of the piston rod 308 cannot flow into the upper fluid chamber 310 because the chamber orifice 324 is blocked by the needle 316. Since fluid flow out of the hollow chamber 320 has stopped, fluid does not flow through the regulator rebound orifices 415 nor does it flow through the primary openings 412 and the hollow chamber openings 413. Instead, fluid flow from the lower fluid chamber 312 to the upper fluid chamber 310 during rebound is restricted to only the amount flowing out through the rebound channel exit openings 806 of the piston 304. In one embodiment, this stage of rebound may offer the maximum rebound resistance.

Further Description of Components and Additional Embodiments

Figure 11:
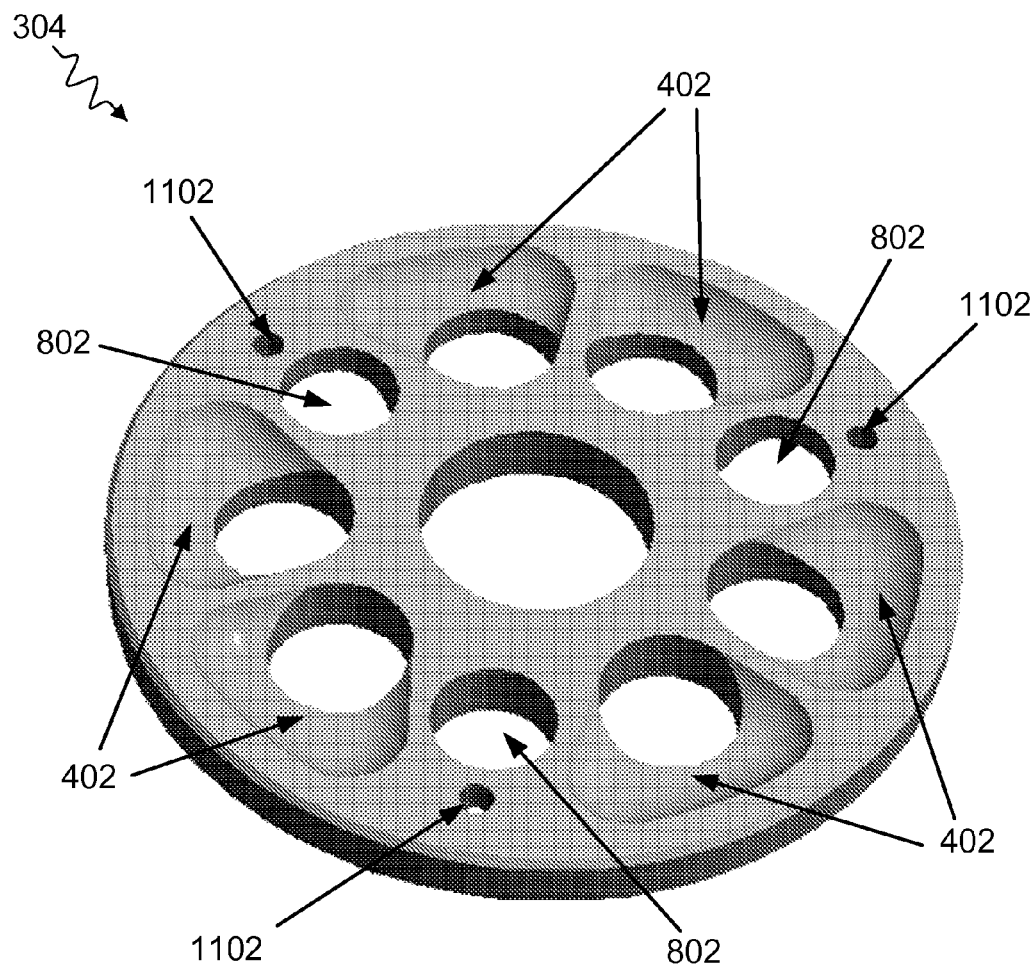
FIG. 11 illustrates a top perspective view of the piston featuring the compression channels, the rebound channels, and a plurality of bleed holes according to one embodiment.

FIG. 11 illustrates a top perspective view of the piston 304 featuring the compression channels 402, the rebound channels 802, and a plurality of bleed holes 1102 according to one embodiment. The compression valve stack 408 and the rebound valve stack 410 have been omitted to clearly show the channels 402, 802. The bleed holes are optional and serve to allow at least some fluid to flow from the upper fluid chamber 310 to the lower fluid chamber 312 during compression, particularly at times where the piston is moving slowly during compression. Similarly, the bleed holes serve to allow at least some fluid to flow from the lower fluid chamber 312 to the upper fluid chamber 310 during rebound, particularly at times where the piston is moving slowly during rebound. In one embodiment, the bleed holes are not covered by either the compression valve stack 408 or rebound valve stack 410.

Figure 12:
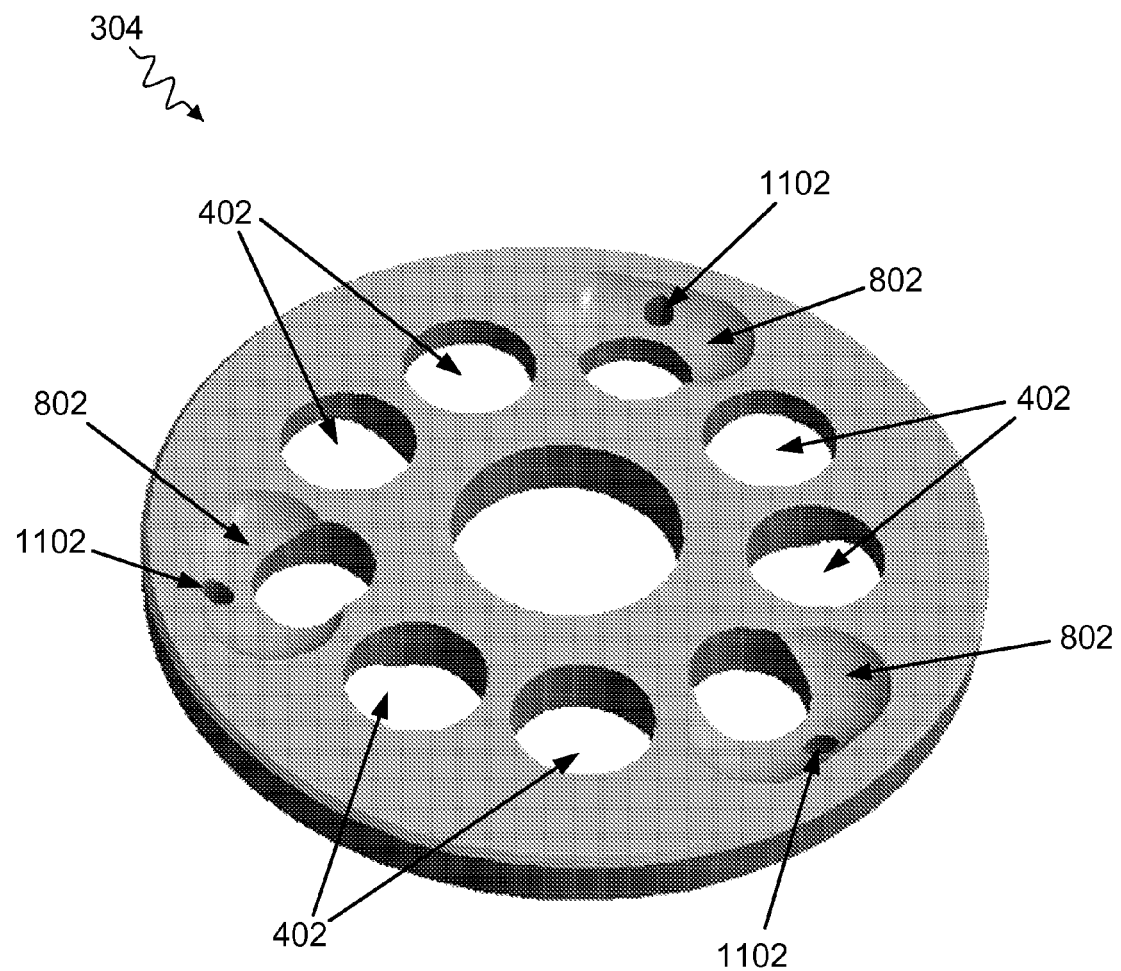
FIG. 12 illustrates a bottom perspective view of the piston featuring the compression channels, the rebound channels, and the bleed holes according to one embodiment.

FIG. 12 illustrates a bottom perspective view of the piston 304 featuring the compression channels 402, the rebound channels 802, and the bleed holes 1102 according to one embodiment. The compression valve stack 408 and the rebound valve stack 410 have been omitted to clearly show the channels 402, 802. In the embodiment, shown in FIGS. 11-12, there are six (6) compression channels 402, three (3) rebound channels 802, and three (3) bleed holes. However, in other embodiments, any number and combination of compression channels 402, rebound channels 802, and bleed holes 1102 may be implemented for the piston 304.

Figure 13:
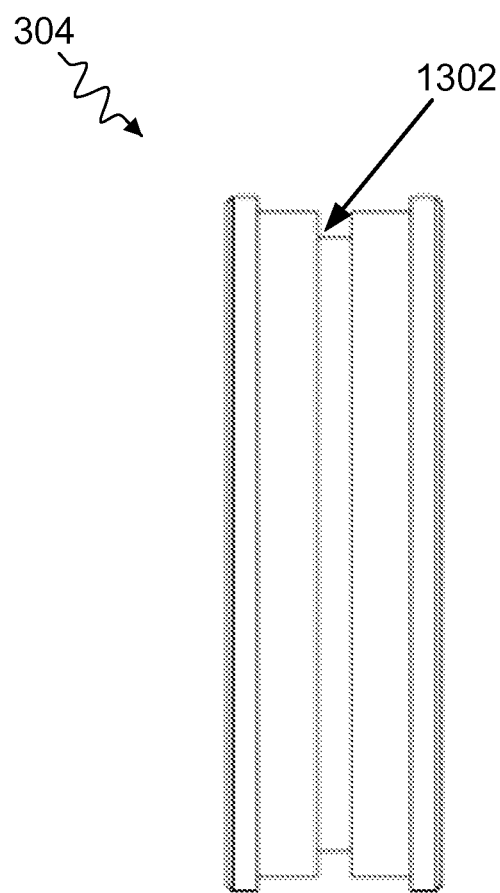
FIG. 13 illustrates a side view of the piston featuring an O-ring groove according to one embodiment.

FIG. 13 illustrates a side view of the piston 304 featuring an O-ring groove 1302 according to one embodiment. The O-ring groove 1302 serves to accommodate a rubber O-ring that helps seal the upper fluid chamber 310 from the lower fluid chamber 312.

Figure 14:
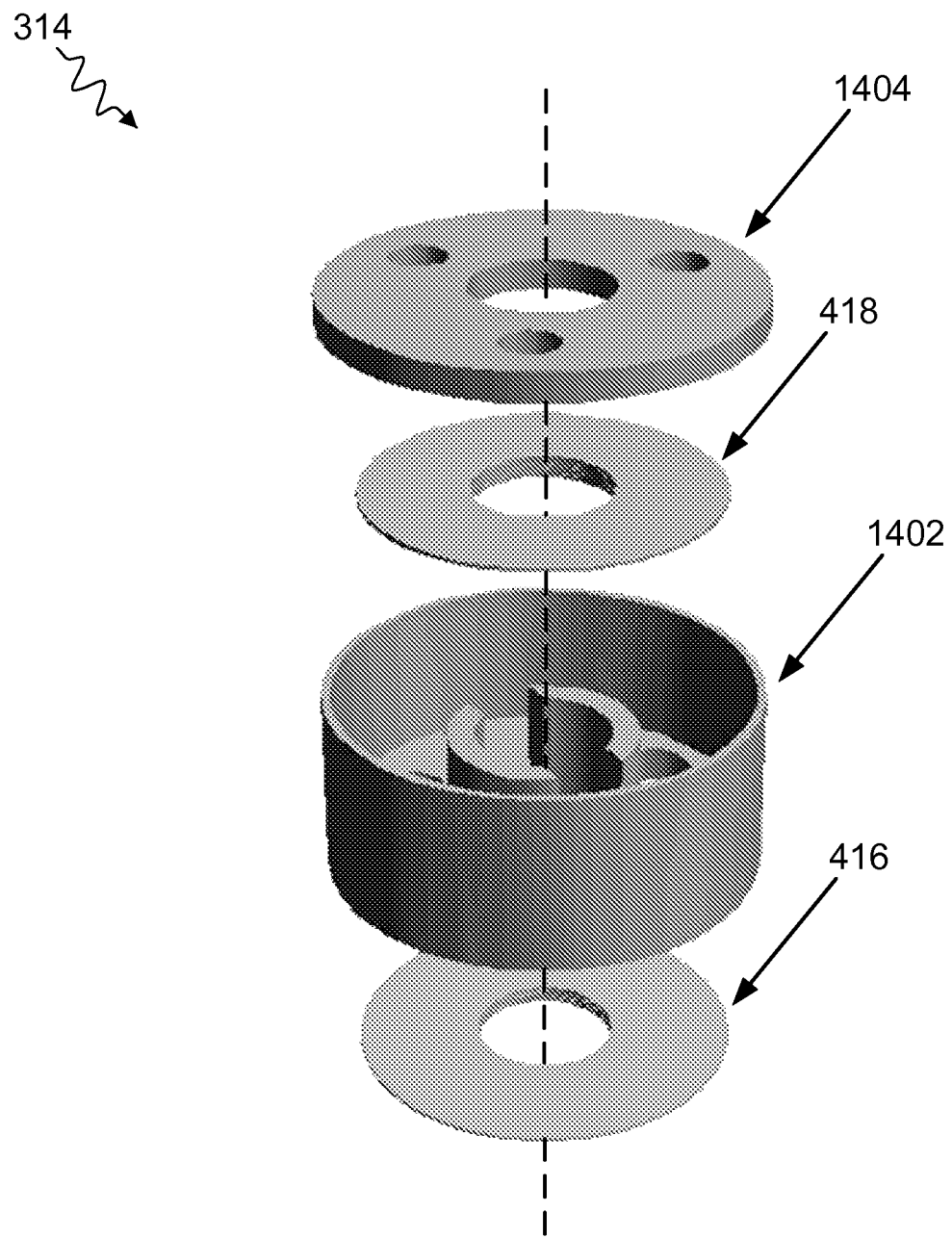
FIG. 14 illustrates a top perspective, exploded view of the fluid flow regulator.

FIGS. 14-21 illustrate the fluid flow regulator 314 according to one embodiment. FIG. 14 illustrates a top perspective, exploded view of the fluid flow regulator 314. The fluid flow regulator 314 may comprise a main body 1402, a cover plate 1404, the regulator compression valve stack 416, and the regulator rebound valve stack 418.

Figure 15:
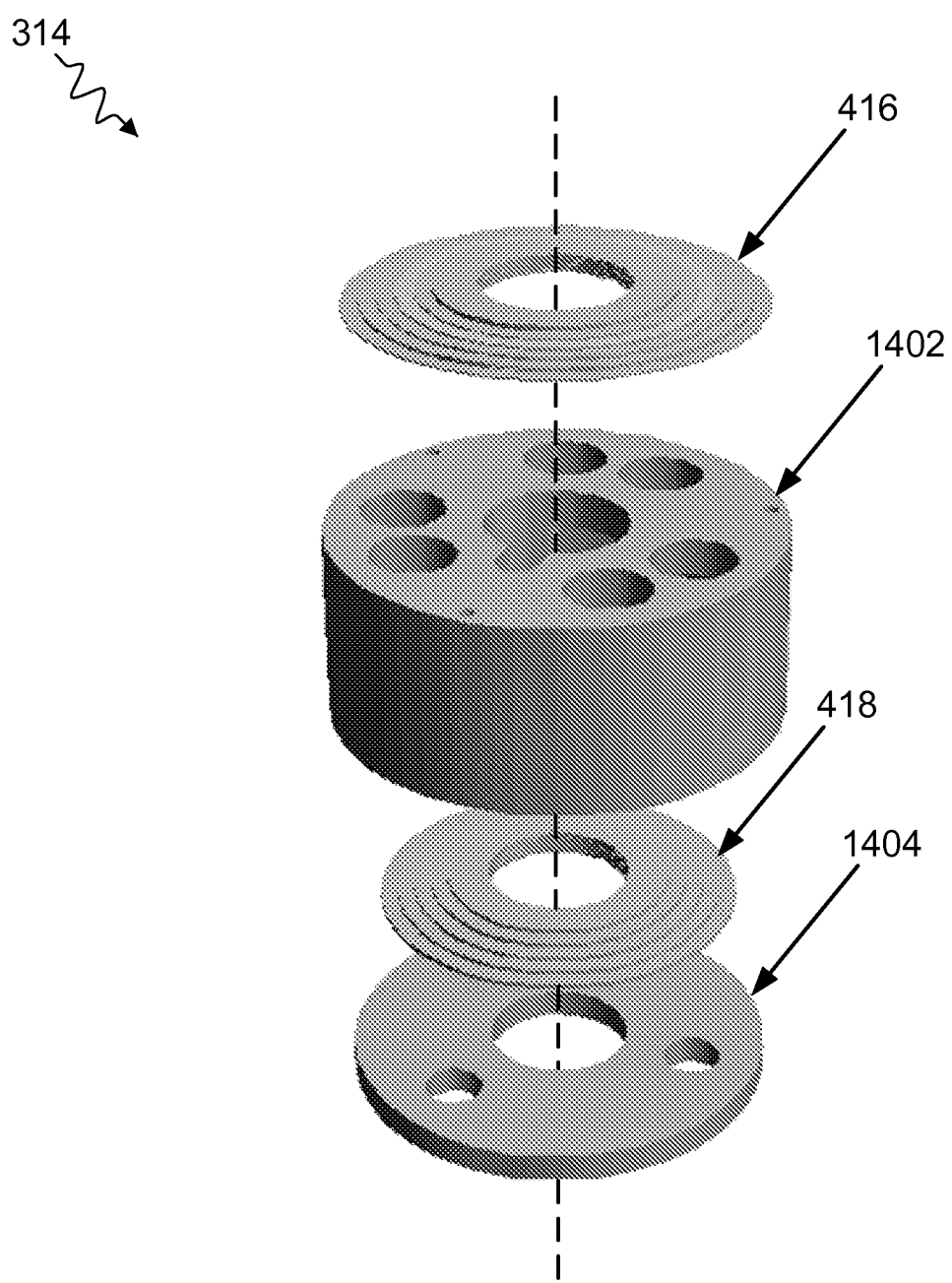
FIG. 15 illustrates a bottom perspective, exploded view of the fluid flow regulator.

FIG. 15 illustrates a bottom perspective, exploded view of the fluid flow regulator 314.

Figure 16:
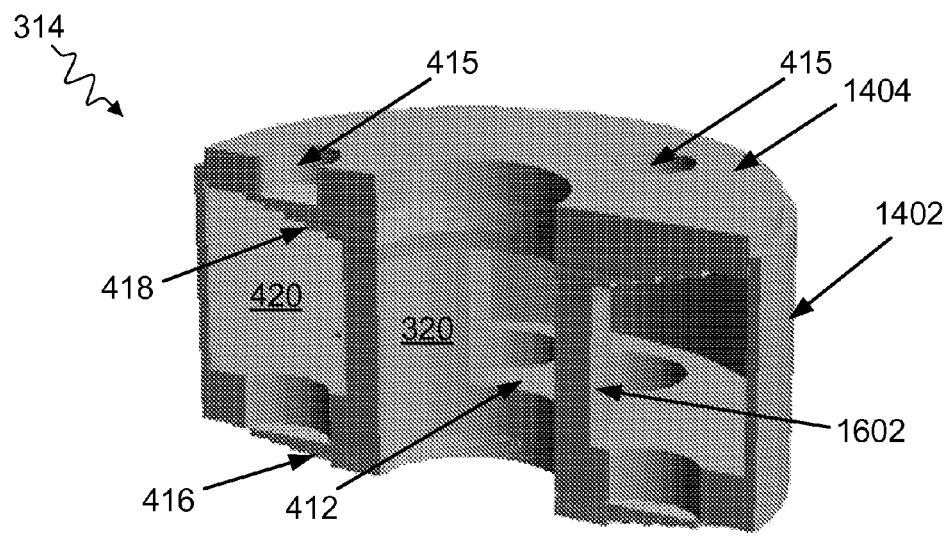
FIG. 16 illustrates a top perspective, sectional view of the fluid flow regulator.

FIG. 16 illustrates a top perspective, sectional view of the fluid flow regulator 314. The cover plate 1404 may fit, at least partially, inside and cover the main body 1402. The cover plate 1404 may removably couple to the main body 1402. The main body 1402 includes a central support structure 1602 that helps support the regulator rebound valve stack 418. Specifically, the space in between the cover plate 1404 and central support structure 1602 of the main body 1402 accommodates the regulator rebound valve stack 418. The regulator rebound valve stack 418 may be positioned in between the central support structure 1602 and the cover plate 1404 so that it rests on top of the central support structure 1602. In one embodiment, the regulator rebound valve stack 418 sits flush against the interior side of the cover plate 1404, thereby covering the regulator rebound orifices 415. The central support structure 1602 has one or more cut out portions that form the primary openings 412. The primary openings 412 may align up with and couple to the hollow chamber openings 413 of the piston rod 308, thereby allowing fluid to flow back and forth between the hollow chamber 320 and the interior cavity 420 of the fluid flow regulator 314.

Figure 17:
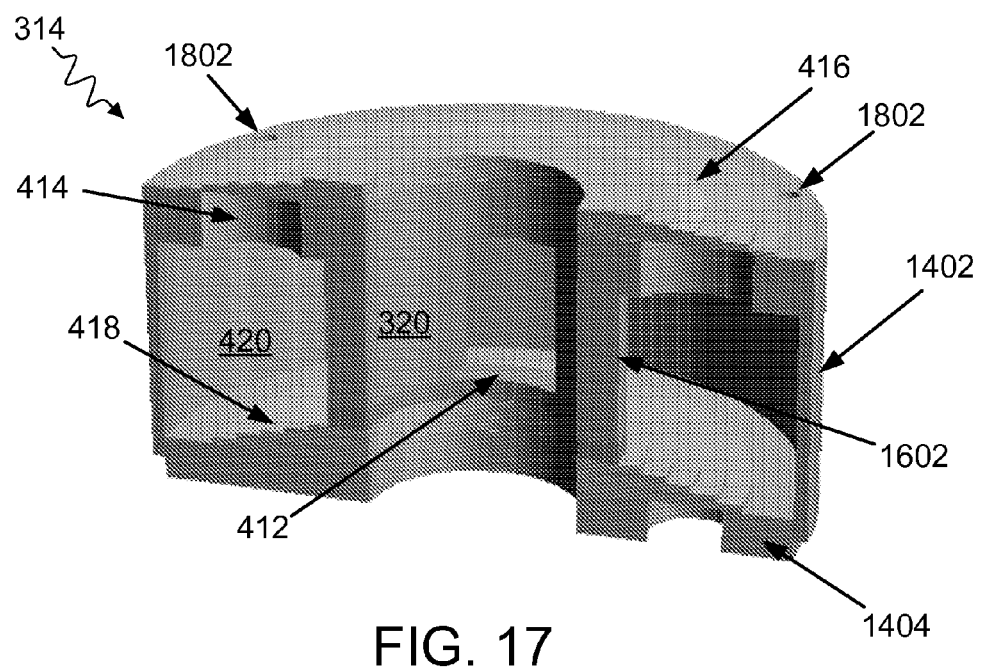
FIG. 17 illustrates a bottom perspective, sectional view of the fluid flow regulator.

FIG. 17 illustrates a bottom perspective, sectional view of the fluid flow regulator 314. In one embodiment, the regulator compression valve stack 416 sits flush against the bottom, exterior surface of the main body 1402, thereby covering the regulator compression orifices 414.

Figure 18:
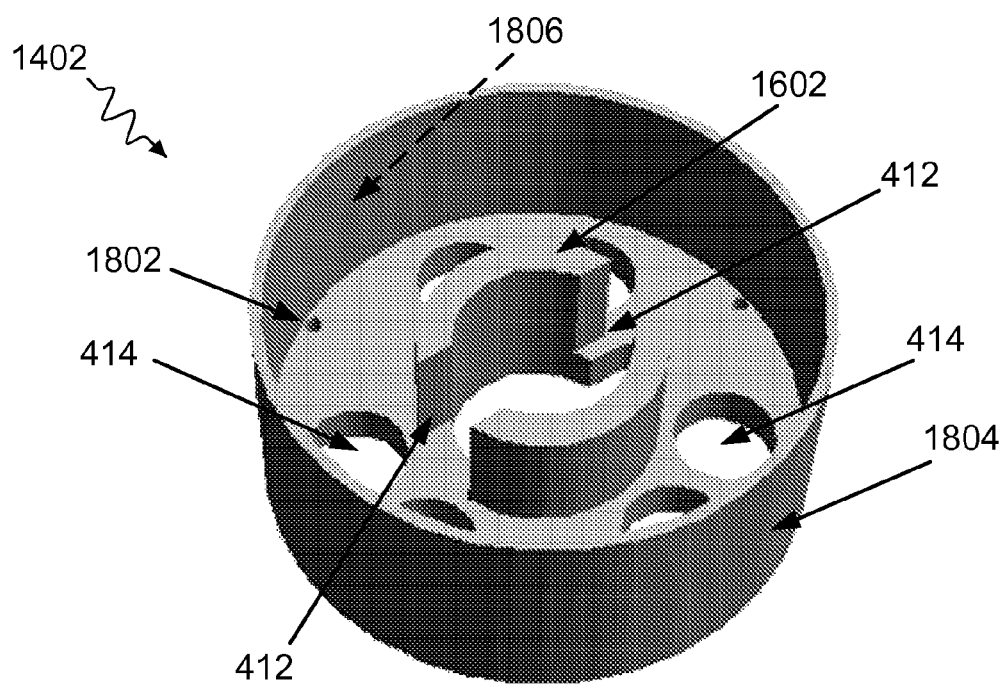
FIGS. 18 and 19 illustrate top and bottom perspective views, respectively, of the main body of the fluid flow regulator according to one embodiment.
Figure 19:
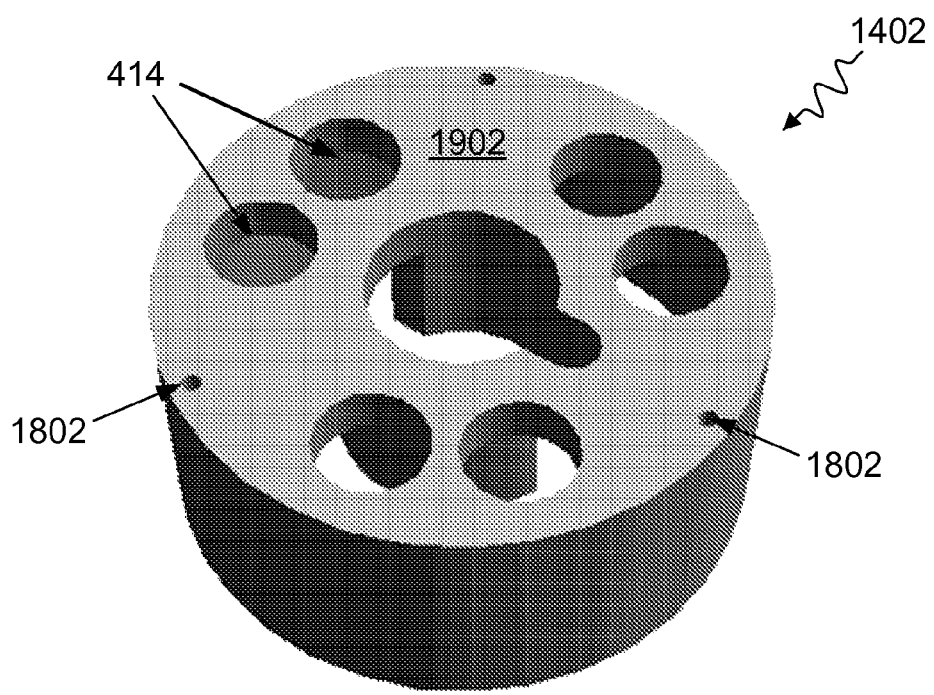

FIGS. 18 and 19 illustrate top and bottom perspective views, respectively, of the main body 1402 of the fluid flow regulator 314 according to one embodiment. The main body 1402 further includes the regulator compression orifices 414 and one or more bleed holes 1802. The regulator compression orifices 414 allow fluid to flow from the interior cavity 420 into the lower fluid chamber 312 during compression.

Referring to FIG. 19, the compression orifices 414 along the bottom surface 1902 of the fluid flow regulator 314 may be covered by the regulator compression valve stack 416 because the regulator compression valve stack 416 may sit flush against the bottom surface 1902 of the regulator 314 (as shown in FIG. 17). Although the regulator compression valve stack 416 may cover the regulator compression orifices 414 at the bottom surface 1902, the bleed holes 1802 are not covered by the regulator compression valve stack 416 (See also FIG. 17), and thus fluid can freely flow at a minimum rate between the lower fluid chamber 312 and the interior cavity 420 during rebound and/or compression (e.g., when the fluid flow regulator 314 is undergoing compression and/or rebound at a slow rate). In one embodiment, the curved, outer surface of the main body 1402 may also feature bleed holes similar to the bleed holes 1802 in terms of size and function.

Figure 20:
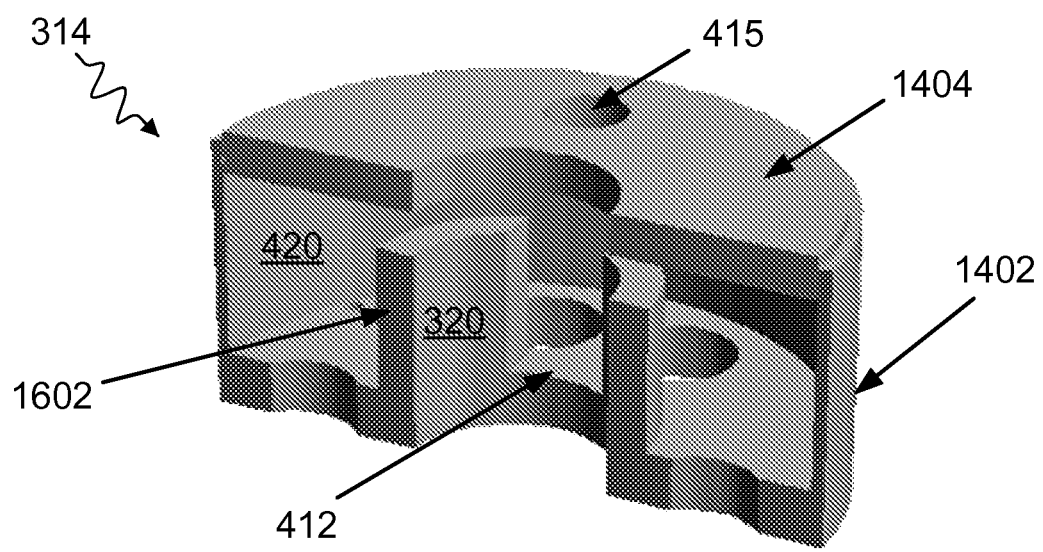
FIG. 20 illustrates a top perspective, sectional view of the fluid flow regulator with the regulator compression valve stack and regulator rebound valve stack removed.

FIG. 20 illustrates a top perspective, sectional view of the fluid flow regulator 314 with the regulator compression valve stack 416 and regulator rebound valve stack 418 removed.

Figure 21:
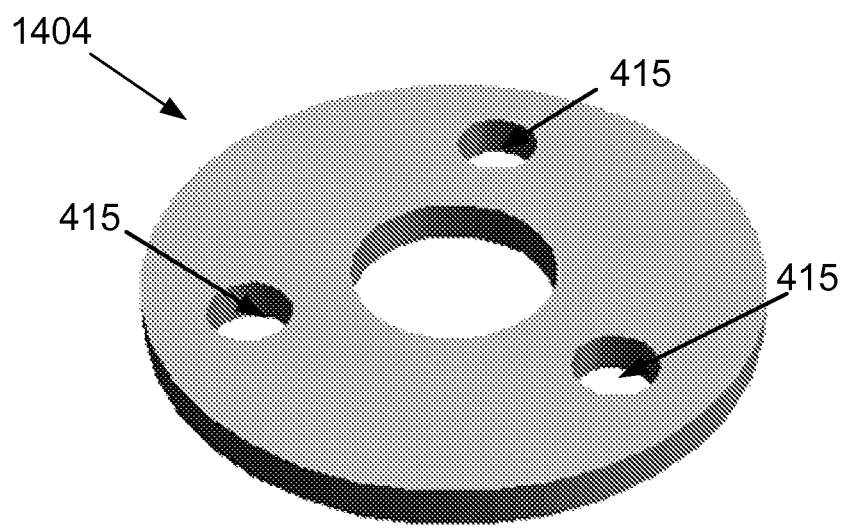
FIG. 21 illustrates a perspective view of the cover plate of the fluid flow regulator according to one embodiment.

FIG. 21 illustrates a perspective view of the cover plate 1404 of the fluid flow regulator 314 according to one embodiment. The cover plate 1404 may comprise one or more regulator rebound orifices 415. The regulator rebound orifices 415 allow fluid to flow from lower fluid cavity 312 into the interior cavity 420 of the fluid flow regulator 314 during rebound. In one embodiment, the cover plate 1404 may feature one or more bleed holes. These bleed holes may be similar to the bleed holes 1802 in terms of size and function.

As illustrated in the previous figures, in one embodiment the fluid flow regulator 314 may comprise six (6) regulator compression orifices and three (3) regulator rebound orifices. In other embodiments, the fluid flow regulator 314 may have any number of regulator compression orifices 414, including zero, and any number of regulator rebound orifices 415, including zero. In one embodiment, the fluid flow regulator 314 may not include a regulator rebound valve stack 418. In such a case, the regulator rebound orifices 415 may be unimpeded. In another embodiment, the fluid flow regulator 314 may not include a regulator compression valve stack 416. In such a case, the regulator compression orifices 414 may be unimpeded. In another embodiment, the main body 1402 may comprise one or more regulator rebound orifices instead of or in addition to regulator compression orifices 414. The regulator rebound orifices may be covered by a valve stack including at least one deflectable disc contained within an interior cavity of the main body. In another embodiment, the cover plate 1404 may comprise one or more regulator compression orifices instead of or in addition to the regulator rebound orifices 415. The regulator compression orifices may be covered by a valve stack including at least one deflectable disc.

Figure 22:
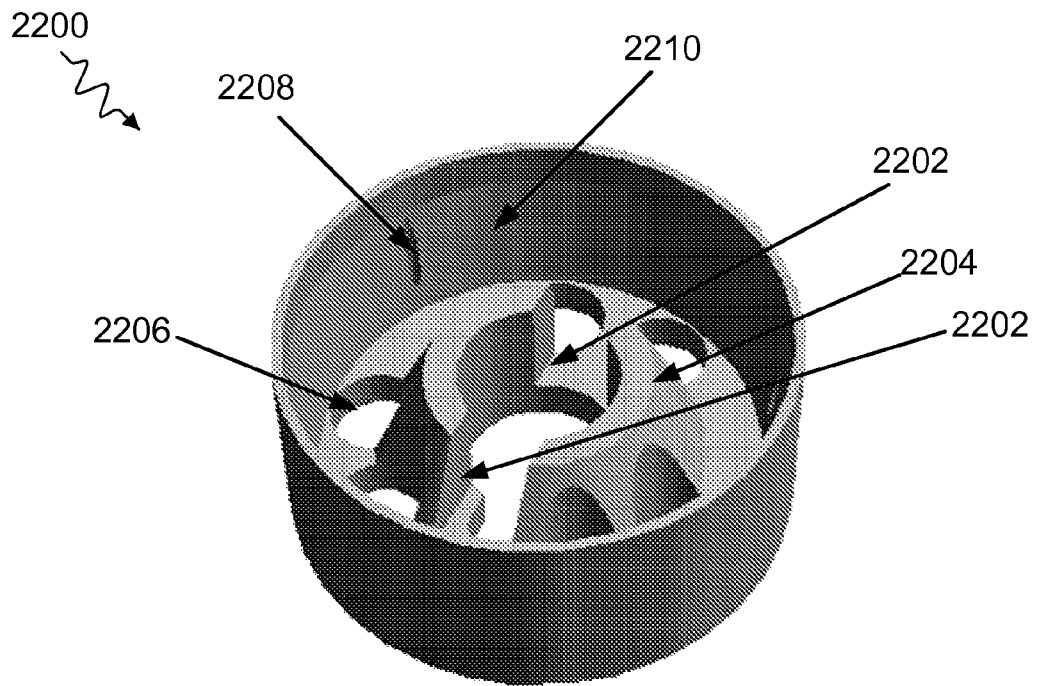
FIGS. 22-26 illustrate an alternative embodiment of the main body of the fluid flow regulator.
Figure 23:
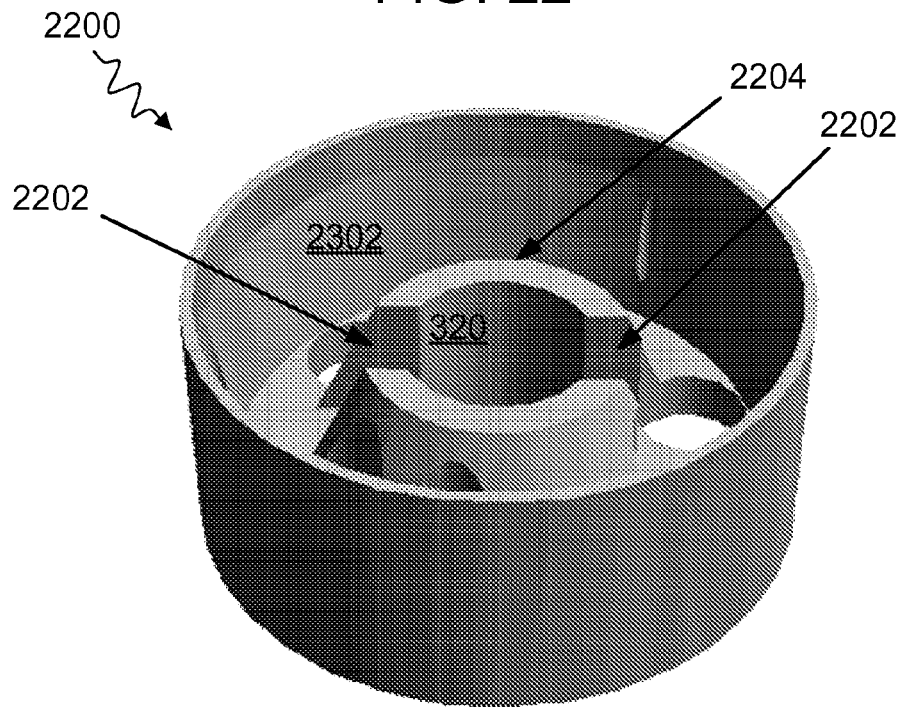
Figure 24:
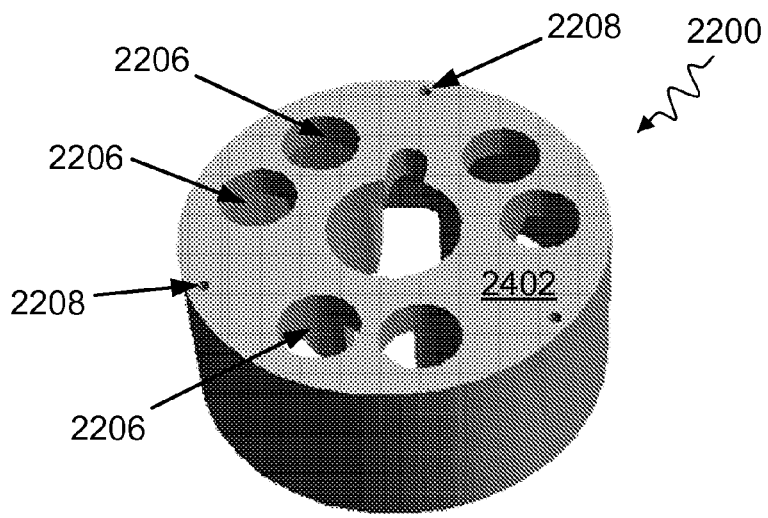
Figure 25:
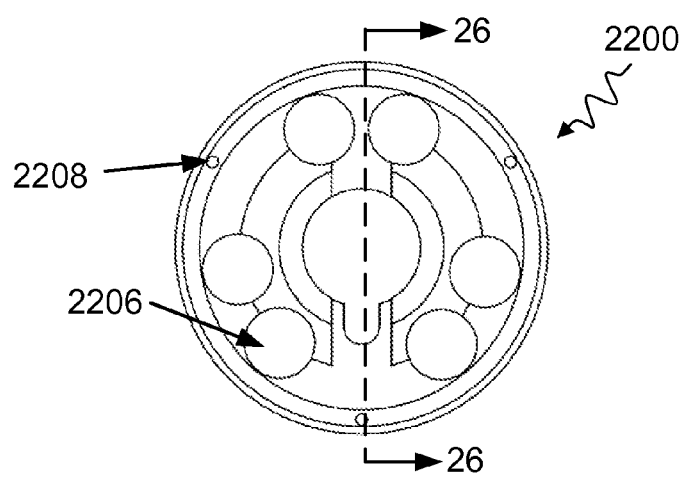
Figure 26:
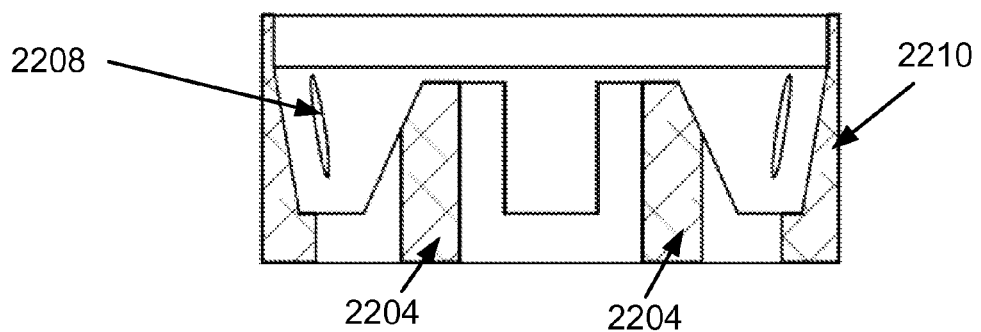

FIGS. 22-26 illustrate an alternative embodiment of the main body 2200 of the fluid flow regulator 314. Specifically, FIGS. 22 and 23 illustrate top perspective views of the main body 2200, FIG. 24 illustrates a bottom perspective view of the main body 2200, FIG. 25 illustrates a top view of the main body, and FIG. 26 illustrates a cross sectional view of the main body 2200. The main body 2200 comprises one or more primary openings 2202, a tapered central support structure 2204, a plurality of regulator compression orifices 2206, one or more bleed holes 2208, and a tapered interior side wall 2210.

The tapered central support structure 2204 is wider/thicker at its base than a top portion of the tapered central support structure 2204. The tapered central support structure's 2204 base is also thicker than the base of the central support structure 1602 shown in FIG. 16. In other words, the tapered central support structure 2204 increases in thickness as it grows closer to the regulator compression orifices 2206. This give the tapered central support structure 2204 stronger base support than the central support structure 1602 in FIG. 16. Similarly, the tapered interior side wall 2210 is wider at its base than the interior side wall 1806 shown in FIG. 18. The tapered interior side wall 2210 may provide additional support than the interior side wall 1806. The primary openings 2202 allow fluid to flow back and forth between the interior cavity 2302 of the main body 2200 and the hollow chamber 320. The bleed holes 2208 are uncovered channels that pass from the interior cavity 2302 through to an exterior, bottom surface 2402 of the main body. The bleed holes 2208 remain uncovered by deflection discs so that fluid can freely flow at a minimum rate between the lower fluid chamber 312 and the interior cavity 2302 (e.g., when the fluid flow regulator is undergoing compression/rebound at a slow rate). The regulator compression orifices 2206 allow fluid to flow from the interior cavity 2302 into the lower fluid chamber 312 during compression. Although not shown in FIG. 24, the regulator compression orifices 2206 may be covered by a regulator compression valve stack 416 at the bottom surface 2402 of the main body 2200.

FIG. 25 illustrates a top view of the main body 2200.

FIG. 26 illustrates a cross sectional view of the main body 2200.

Figure 27:
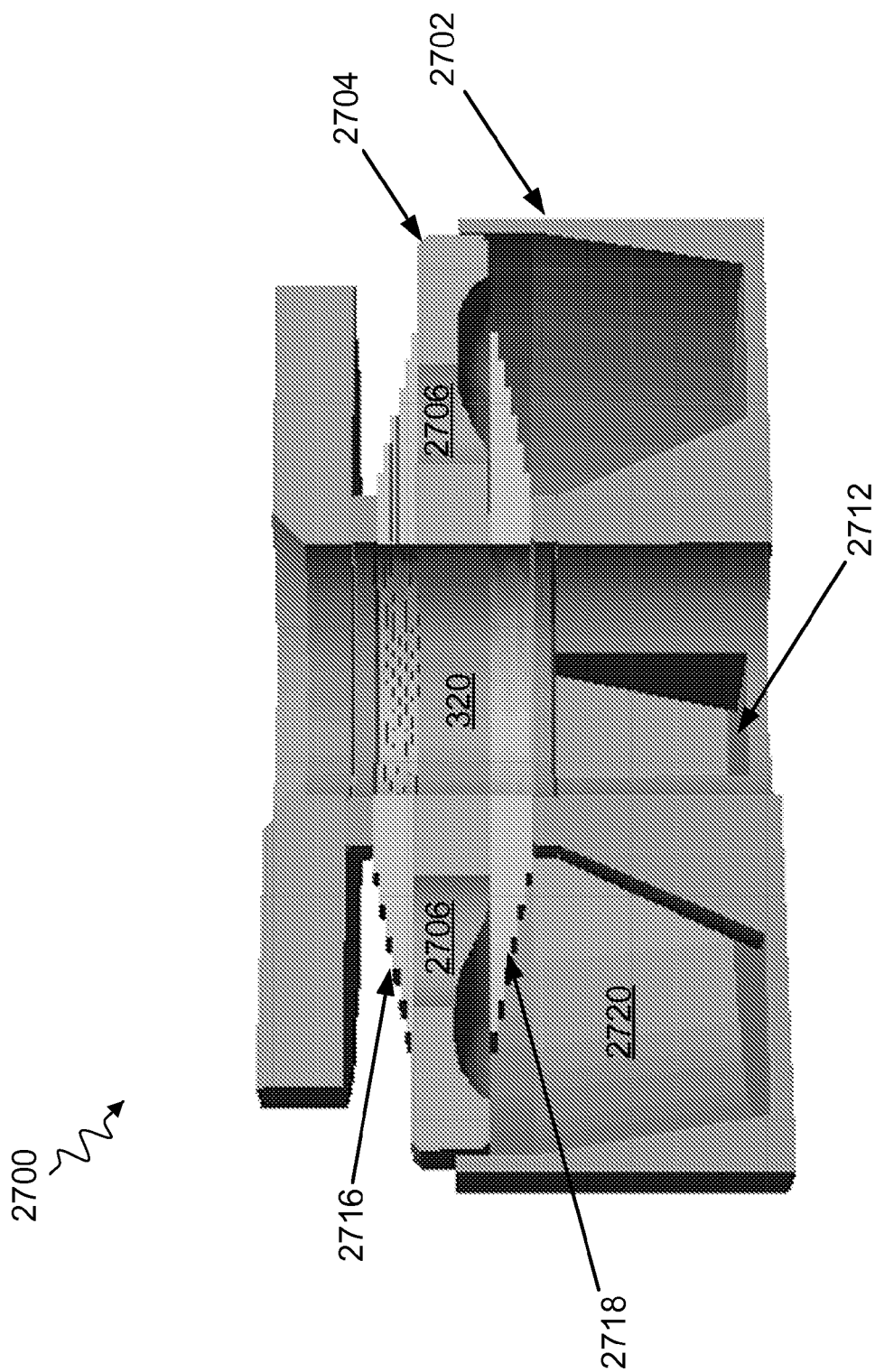
FIGS. 27 and 28 illustrate another embodiment of the fluid flow regulator.
Figure 28:
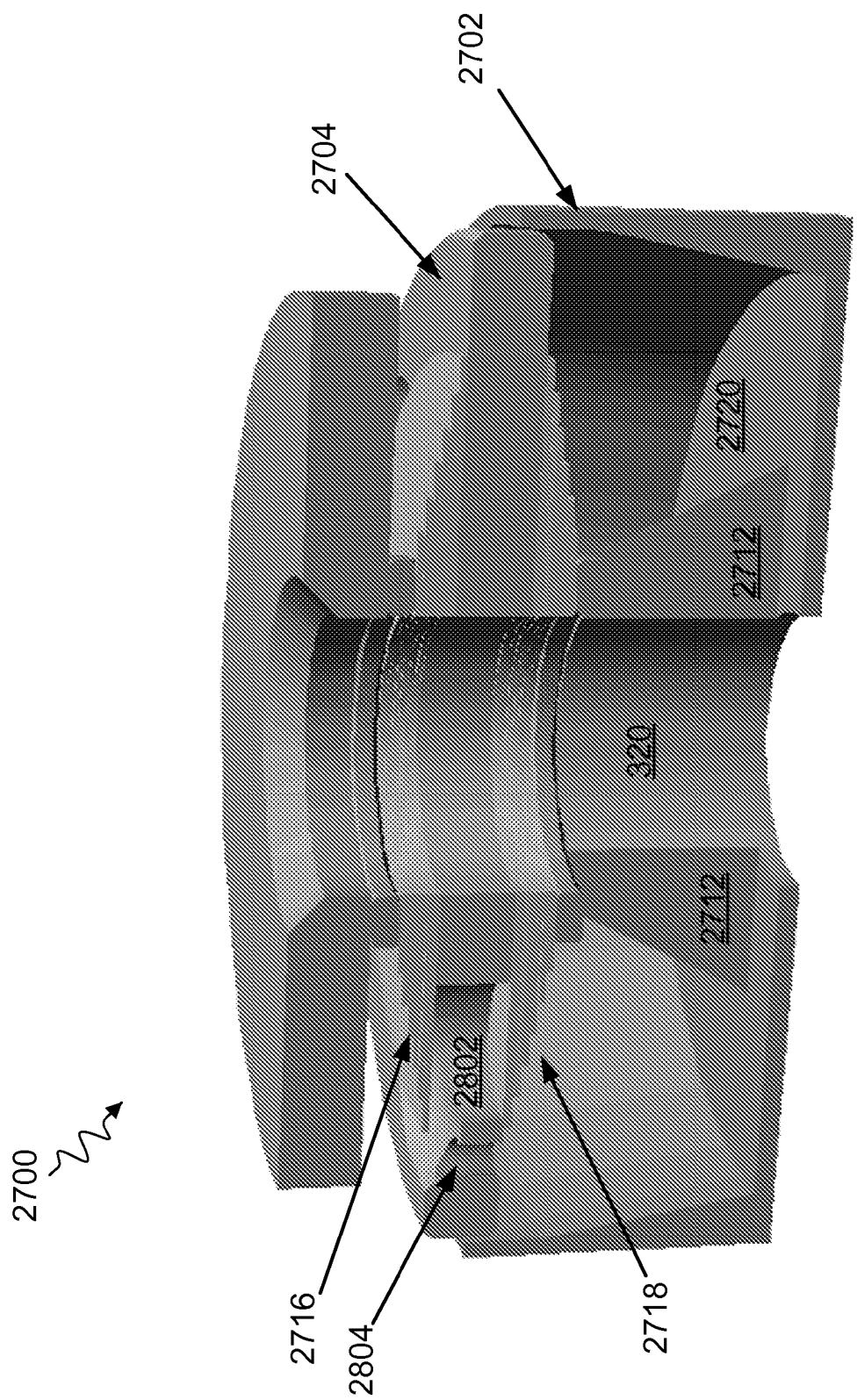

FIGS. 27 and 28 illustrate another embodiment of the fluid flow regulator 2700. Referring to FIGS. 27 and 28, the fluid flow regulator 2700 comprises a main body 2702, a removable cover plate 2704, one or more primary openings 2712, a regulator compression valve stack 2716, a regulator rebound valve stack 2718, and an internal cavity 2720. The removable cover plate 2704 features one or more regulator compression channels 2706, one or more regulator rebound channels 2802, and/or one or more bleed holes 2804.

By contrast to the fluid flow regulator 314, the regulator compression valve stack 2716 is positioned flush against the removable cover plate 2704 instead of against the bottom surface of the main body 2702. Specifically, the regulator compression valve stack 2716 lies flush against a side of the removable cover plate 2704 that is opposite to the side of the plate 2704 against which the regulator rebound valve stack 2718 is positioned. Thus, the removable cover plate 2704 is sandwiched in between the stacks 2716, 2718. The cover plate 2704 may be removed in order to access the regulator rebound valve stack 2718 contained with the interior cavity 2720 of the fluid flow regulator 314. For example, a user may remove the cover plate 2704 in order to change the number, thickness, and/or diameter of the deflection discs that comprise the stack 2718. The unimpeded bleed holes 2804 in the cover plate 2704 allow fluid to flow into and out of the fluid flow regulator 2700 during rebound and compression, respectively. For example, the bleed holes 2804 allow fluid flow at times where the shock absorber is undergoing compression or rebound at a very slow rate.

During compression, fluid may first flow into the hollow chamber 320 of the piston rod 308 through the chamber orifice 324 (See FIG. 3B). Then, the fluid may flow into the interior cavity 2720 from the hollow chamber 320 via the primary openings 2712. Next, the fluid in the interior cavity 2720 may flow around the regulator rebound valve stack 2718 and into the regulator compression channels 2706. The fluid pressure in the regulator compression channels may force/deflect open the regulator compression valve stack 2716 and cause the fluid to flow into the lower fluid chamber 312. (These actions may take place during compression assuming the needle 316 is not completely blocking the chamber orifice 324.)

During rebound, fluid may first flow around the regulator compression valve stack 2716 and into the regulator rebound channels 2802. The fluid pressure within the regulator rebound channels 2802 may force/deflect open the regulator rebound valve stack 2718, and cause fluid to flow into the interior cavity 2720 of the main body 2702. Then, the fluid may flow past the primary openings 2712 and into the hollow chamber 320 of the piston rod 308. Finally the fluid may flow into the upper fluid chamber 310 from within the hollow chamber 320 via the chamber orifice 324 (See FIG. 3B). (These actions may take place during rebound assuming the needle 316 is not completely blocking the chamber orifice 324.)

Figure 29:
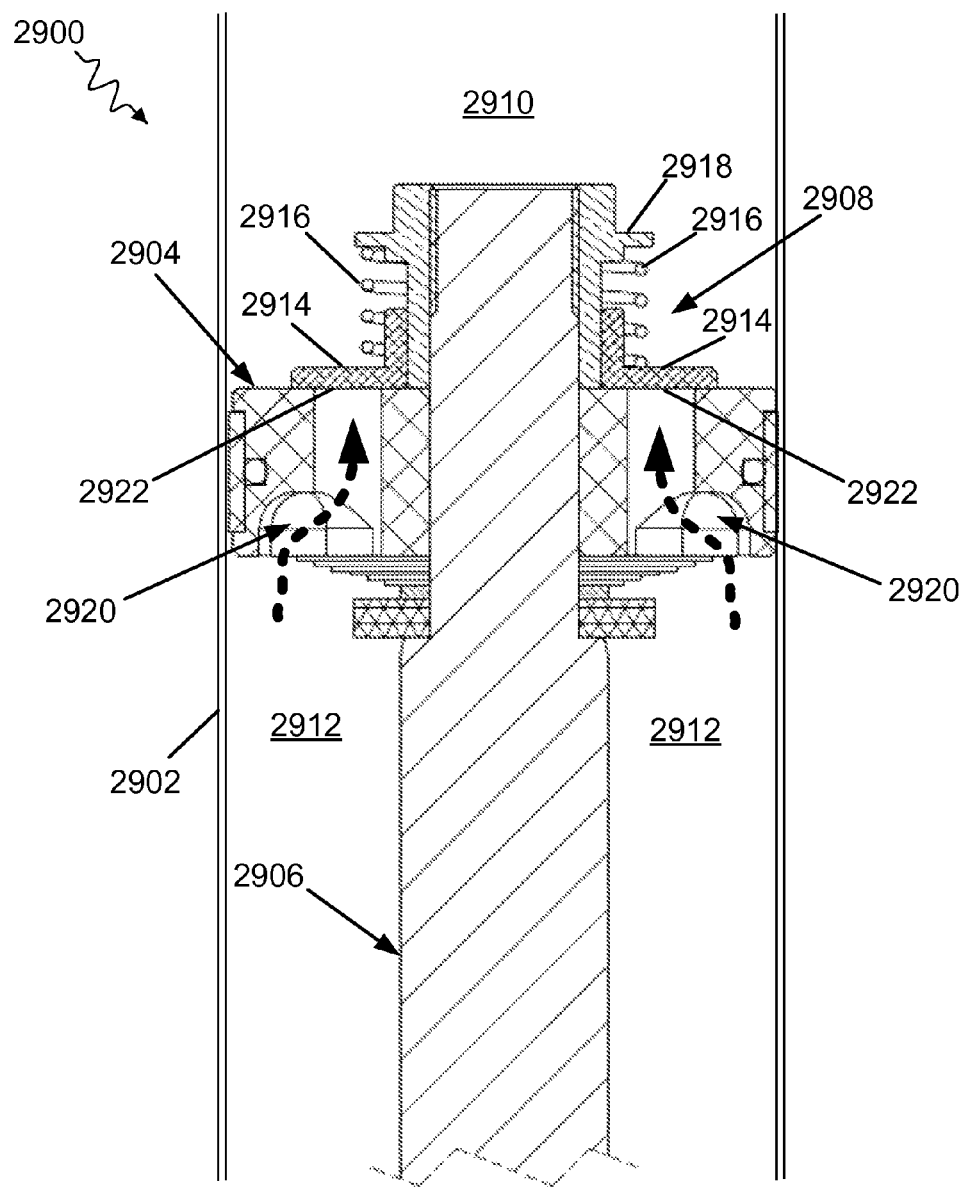
FIG. 29 illustrates a sectional view of a shock absorber according to one embodiment that features a rebound check valve assembly.

FIG. 29 illustrates a sectional view of a shock absorber 2900 according to one embodiment that features a rebound check valve assembly 2908. The shock absorber comprises a cylindrical housing 2902 that contains therein a piston 2904. The piston 2904 is coupled to one end of a piston rod 2906.

The rebound check valve assembly 2908 controls the flow of fluid from the lower fluid chamber 2912 into the upper fluid chamber 2910 during rebound. The rebound check valve assembly 2908 may be used instead of the rebound valve stack 410 shown in FIG. 4. Referring to FIG. 29, the rebound check valve assembly 2908 includes a check valve 2914 and a spring 2916. The spring 2916 is positioned in between the stationary spring support 2918 and the check valve 2914. The spring 2916 forces the check valve 2914 to rest flush against a top surface of the piston 2904, thereby covering the exit openings 2922 of the rebound channels 2920.

During rebound, if the fluid pressure within the rebound channels 2920 is great enough (e.g., the fluid pressure exceeds the spring force of the spring 2916), fluid flow (as indicated by the dashed arrows) within the rebound channels 2920 forces the check valve 2914 open. This may occur when the shock absorber 2900 undergoes rebound in an abrupt manner. Once the check valve 2914 is forced open, fluid from the lower fluid chamber 2912 flows into the upper fluid chamber 2910 via the exit openings 2922. Thus, during times where the piston 2904 is undergoing rebound in a rapid manner, the check valve assembly 2908 substantially decreases the rebound resistance by quickly allowing fluid to flow from the lower fluid chamber 2912 into the upper fluid chamber 2910.

In one embodiment, the check valve assembly 2908 may be used in conjunction with the shock absorber 300 shown in FIGS. 3B and 4-10. For example, instead of a rebound valve stack 410, the shock absorber 300 may utilize the check valve assembly 2908 shown in FIG. 29 to control rebound resistance. Thus, according to one embodiment, a shock absorber may comprise the piston 304 having the rebound check valve assembly 2908, and the fluid flow regulator 314 to control the flow of fluid through the hollow chamber 320 of the piston rod 308. In other words, various fluid flow regulator embodiments disclosed herein may be used in conjunction with the piston 2904 featuring the rebound check valve assembly 2908.

According to another embodiment, the regulator compression valve stack 416 of the shock absorber 300 may be replaced with a check valve assembly similar in design to the rebound check valve assembly 2908 shown in FIG. 29. Thus, instead of one or more deflection discs, a check valve assembly comprising a spring loaded check valve may keep the regulator compression orifices 414 shut until fluid forces open the check valve during compression. Similarly, the regulator rebound valve stack 418 of the shock absorber 300 may be replaced with a check valve assembly similar in design to the rebound check valve assembly 2908 shown in FIG. 29. Thus, instead of one or more deflection discs, a check valve assembly comprising a spring loaded check valve may keep the regulator rebound orifices 415 shut until fluid forces open the check valve during rebound.

The shock absorbers featuring a fluid flow regulator described herein allow a user to adjust the compression and rebound resistance characteristics of the shock absorber in a variety of ways. For example, modifications and adjustments may be made to various features of the needle 316, the piston 304, 2904, and the fluid flow regulator 314, 2900 that will affect the compression and rebound resistance characteristics of the shock absorber.

In one embodiment, adjustments may be made to the needle 316 and its tapered end 318 to change the compression and rebound resistance characteristics of the shock. For example, the length of the needle 316 may be adjusted in order to change the position where the maximum compression and rebound resistance begins. In one embodiment, a user may desire replace the needle 316 with a longer one in order to increase the position at which the maximum rebound and compression resistance of the shock absorber comes in. In another embodiment, a user may desire to replace the needle 316 with a shorter one in order to decrease the position at which the maximum rebound and compression resistance of the shock absorber comes in. In yet another embodiment, a user may replace the needle 316 with another one having a narrower diameter (less thick) than the chamber orifice 324 diameter. In such a case, the needle will never completely block the fluid flow through the hollow chamber 320, and thus, the maximum rebound and compression resistance will decrease.

In another embodiment, the needle 316 may be replaced by a user with a needle 316 having a tapered needle end of a different shape or taper progression than the tapered needle end 318 shown in FIG. 3B. For example, the tapered needle end may be designed so that its thickness increases very slowly along the length of the needle 316. In such a case, the compression resistance will similarly increase slowly as the tapered needle end progresses deeper into the hollow chamber 320 during compression. By contrast, the tapered needle end may be designed so that its thickness increases very rapidly along the length of the needle 316 (i.e., the tapered needle end is very short). In such a case, the compression resistance will quickly increase as the tapered needle end progresses deeper into the hollow chamber 320, and will reach the maximum resistance much sooner than if the tapered needle end constituted a greater portion of the length of the needle.

In one embodiment, adjustments may be made to the fluid flow regulator 314, 2900 to change the rebound and compression resistance characteristics of the shock absorber. For example, a user may adjust the number, diameter size, and/or thickness of the deflection discs of the regulator rebound valve stack 418, 2918 and/or the regulator compression valve stack 416, 2916. In one embodiment, a user may increase the number of deflection discs for the regulator rebound valve stack 418, 2918 and/or the regulator compression valve stack 416, 2916 in order to increase rebound resistance and compression resistance, respectively. The user may also decrease the number of deflection discs for the regulator rebound valve stack 418, 2918 and/or the regulator compression valve stack 416, 2916 in order to decrease rebound resistance and compression resistance, respectively. In another embodiment, a user may use deflection discs having a larger diameter for the regulator rebound valve stack 418, 2918 and/or the regulator compression valve stack 416, 2916 in order to increase rebound resistance and compression resistance, respectively. The user may also use deflection discs having a shorter diameter for the regulator rebound valve stack 418, 2918 and/or the regulator compression valve stack 416, 2916 in order to decrease rebound resistance and compression resistance, respectively.

In yet another embodiment, a user may use thicker deflection discs for the regulator rebound valve stack 418, 2918 and/or the regulator compression valve stack 416, 2916 in order to increase rebound resistance and compression resistance, respectively. The user may also use thinner deflection discs for the regulator rebound valve stack 418, 2918 and/or the regulator compression valve stack 416, 2916 in order to decrease rebound resistance and compression resistance, respectively. In another embodiment, the user may use deflection discs that are composed of a less elastic material or metal for the regulator rebound valve stack 418, 2918 and/or the regulator compression valve stack 416, 2916 in order to increase rebound resistance and compression resistance, respectively. The user may also use deflection discs that are composed of a more elastic material or metal for the regulator rebound valve stack 418, 2918 and/or the regulator compression valve stack 416, 2916 in order to decrease rebound resistance and compression resistance, respectively.

In yet another embodiment, a user may utilize a fluid flow regulator having larger regulator compression orifices, and/or a greater number of regulator compression orifices in order to decrease compression resistance. The user may utilize a fluid flow regulator having smaller regulator compression orifices, and/or a lesser number of regulator compression orifices in order to increase compression resistance. In yet another embodiment, a user may utilize a fluid flow regulator having larger regulator rebound orifices, and/or a greater number of regulator rebound orifices in order to decrease rebound resistance. The user may utilize a fluid flow regulator having smaller regulator rebound orifices, and/or a lesser number of regulator rebound orifices in order to increase rebound resistance.

In another embodiment, increasing the cross section area and/or number of the primary openings of the fluid flow regulator decreases both compression and rebound resistance when the needle 316 is not completely blocking the chamber orifice 324. By contrast, decreasing the cross section area and/or number of the primary openings of the fluid flow regulator increases both compression and rebound resistance when the needle 316 is not completely blocking the chamber orifice 324.

In one embodiment, the main body 1402 and the cover plate 1404 of the fluid flow regulator 314 may be fused together as a single piece. In such a case, the regulator rebound valve stack 418 may be placed on an exterior surface of the fluid flow regulator 314, instead of inside the interior cavity 420. This way the regulator rebound valve stack 418 can be adjusted/tuned by a user. The fluid flow regulator and other components of the shock absorber disclosed herein may be used with a variety of different types of shock absorbers in the art, including but not limited to, emulsion shocks, internal reservoir shocks, and shocks having a reservoir whose compression characteristics can be adjusted. In one embodiment, the fluid flow regulator 314 depicted in FIG. 3B may be inverted so that the regulator compression valve stack 416 is closer to the top end 322 of the shock 300 than the regulator rebound valve stack 418.

One or more of the components and functions illustrated in FIGS. 1-29 may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A shock absorber, comprising:
    a housing;
    a piston slidably retained within the housing, the piston dividing the housing into a first fluid chamber and a second fluid chamber;
    a partially hollow piston rod coupled to the piston, the piston rod including a chamber orifice at a first end of the piston rod, the piston rod further including a hollow chamber having at least one hollow chamber opening; and
    a tunable fluid flow regulator coupled to the hollow piston rod at the hollow chamber opening, the tunable fluid flow regulator adjustable to change at least one of a rebound resistance or a compression resistance of the shock absorber by adjusting a rate of fluid flow between the hollow chamber of the piston rod and the second fluid chamber, the tunable fluid flow regulator including
    a main body including a cylindrical surface and a bottom surface, the cylindrical surface orthogonal to the bottom surface, the cylindrical surface and the bottom surface together defining a single interior cavity of the fluid flow regulator, the main body further including a central support structure that includes one or more primary openings that are in fluid flow connection with the hollow chamber opening, and each of the primary openings are configured to allow fluid to flow into the single interior cavity when the shock absorber undergoes compression and fluid to flow out of the single interior cavity when the shock absorber undergoes rebound, the fluid flow regulator having at least one regulator rebound orifice,
    a cover plate that is removably coupled to a first end of the main body, and
    a regulator rebound valve stack having at least one deflection disc contained within the single interior cavity of the fluid flow regulator and configured to at least partially cover the regulator rebound orifice, and wherein the regulator rebound valve stack is positioned in between an inner surface of the cover plate and a top portion of the central support structure, the regulator rebound valve stack in contact with the inner surface of the cover plate and the top portion of the central support structure.

2. The shock absorber of claim 1, wherein the deflection disc of the regulator rebound valve stack is configured to deflect during shock absorber rebound to allow fluid to flow from the second fluid chamber into the single interior cavity of the fluid flow regulator.

3. The shock absorber of claim 1, wherein the central support structure is tapered such that a base of the central support structure is thicker than a top portion of the central support structure.

4. The shock absorber of claim 1, wherein the fluid flow regulator includes:
    at least one bleed hole that allows fluid to flow into the single interior cavity of the fluid flow regulator from the second fluid chamber.

5. The shock absorber of claim 1, wherein the fluid flow regulator is adjustable to independently change the rebound resistance or the compression resistance of the shock absorber, such that adjusting the fluid flow regulator to change the rebound resistance of the shock absorber does not affect the compression resistance of the shock absorber, and adjusting the fluid flow regulator to change the compression resistance of the shock absorber does not affect the rebound resistance of the shock absorber.

6. The shock absorber of claim 1, wherein the cover plate includes at least one regulator compression channel and the regulator rebound orifice, and the fluid flow regulator further includes:
    a compression valve stack including at least one deflection disc positioned on an outer surface of the cover plate and configured to at least partially cover the regulator compression channel, the compression valve stack positioned outside the single interior cavity.

7. The shock absorber of claim 1, wherein the fluid flow regulator includes:
    at least one regulator compression orifice; and
    a check valve assembly that covers, at least partially, the regulator compression orifice, wherein the check valve assembly is adapted to be forced open under fluid pressure and allow fluid to flow from the single interior cavity of the fluid flow regulator into the second fluid chamber.

8. The shock absorber of claim 1, further comprising:
    a needle having a first end and a second end, the first end of the needle secured to a top end of the shock absorber and positioned outside the hollow chamber of the piston rod, the second end configured to enter the chamber orifice of the piston rod, wherein a thickness along at least a portion of the needle is substantially equal to a diameter of the chamber orifice.

9. The shock absorber of claim 8, wherein the second end of the needle is tapered.

10. The shock absorber of claim 1, wherein the first end of the main body is an open end that is opposite a second end of the main body, the second end of the main body including the bottom surface.

11. The shock absorber of claim 10, wherein the cover plate is configured to be uncoupled from the main body to allow access to the single interior cavity of the fluid flow regulator via the first end of the main body for adjustment of the rebound resistance.

12. The shock absorber of claim 10, wherein the cover plate includes the regulator rebound orifice.

13. The shock absorber of claim 12, wherein the bottom surface of the main body includes at least one regulator compression orifice, and the tunable fluid flow regulator further includes:
    a regulator compression valve stack having at least one deflection disc positioned outside the single interior cavity of the fluid flow regulator and configured to at least partially cover the regulator compression orifice, the regulator compression valve stack positioned flush against the bottom surface of the main body.

14. The shock absorber of claim 13, wherein the deflection disc of the regulator compression valve stack is configured to deflect during compression of the shock absorber to allow fluid to flow from the single interior cavity into the second fluid chamber.

15. The shock absorber of claim 13, wherein a number, a diameter, and a thickness of the deflection disc of the regulator rebound valve stack is adjustable to change the rebound resistance of the shock absorber, and at least one of a number, a diameter, and a thickness of the deflection disc of the regulator compression valve stack is adjustable to change the compression resistance of the shock absorber.

16. A shock absorber, comprising:
a housing;
a piston slidably retained within the housing, the piston dividing the housing into a first fluid chamber and a second fluid chamber;
a partially hollow piston rod coupled to the piston, the piston rod including a chamber orifice at a first end of the piston rod, the piston rod further including a hollow chamber having at least one hollow chamber opening configured to allow fluid flow into or out of the hollow chamber; and
means for regulating fluid flow between the hollow chamber of the piston rod and the second fluid chamber, the means for regulating coupled to the hollow piston rod substantially at the hollow chamber opening, wherein the means for regulating fluid flow is adjustable to change at least one of a rebound resistance or a compression resistance of the shock absorber, the means for regulating including
a main body including a cylindrical surface and a bottom surface, the cylindrical surface orthogonal to the bottom surface, the cylindrical surface and the bottom surface together defining a single interior cavity of the means for regulating, the main body further including a central support structure that includes one or more primary openings that are in fluid flow connection with the hollow chamber opening, and each of the primary openings are configured to allow fluid to flow into the single interior cavity when the shock absorber undergoes compression and fluid to flow out of the single interior cavity when the shock absorber undergoes rebound, the means for regulating having at least one regulator rebound orifice,
a cover plate that is removably coupled to a first end of the main body, and
means for covering the regulator rebound orifice, the means for covering contained within the single interior cavity of the means for regulating and configured to at least partially cover the regulator rebound orifice, and wherein the means for covering is positioned in between an inner surface of the cover plate and a top portion of the central support structure, the means for covering in contact with the inner surface of the cover plate and the top portion of the central support structure.

17. The shock absorber of claim 16, wherein the cover plate includes the regulator rebound orifice.

18. The shock absorber of claim 17, wherein the bottom surface of the main body includes at least one regulator compression orifice, and the means for regulating further includes:
means for covering the regulator compression orifice, the means for covering the regulator compression orifice positioned outside the single interior cavity of the fluid flow regulator and configured to at least partially cover the regulator compression orifice, the means for covering the regulator compression orifice positioned against the bottom surface of the main body.

19. The shock absorber of claim 16, wherein the first end of the main body is an open end that is opposite a second end of the main body, the second end of the main body including the bottom surface.

20. The shock absorber of claim 16, wherein the cover plate is configured to be uncoupled from the main body to allow access to the single interior cavity for adjustment of the rebound resistance.

21. A fluid flow regulator for a shock absorber, the fluid flow regulator comprising:
a main body including a cylindrical surface and a bottom surface, the cylindrical surface orthogonal to the bottom surface, the bottom surface having at least one regulator compression orifice, the cylindrical surface and the bottom surface together defining a single interior cavity of the fluid flow regulator, the main body further including one or more primary openings that are each configured to allow fluid to flow into the single interior cavity when the shock absorber undergoes compression and fluid to flow out of the single interior cavity when the shock absorber undergoes rebound;
a cover plate having at least one regulator rebound orifice, the cover plate removably coupled to the main body thereby forming the single interior cavity of the fluid flow regulator;
means for covering the regulator rebound orifice, the means for covering the regulator rebound orifice contained within the single interior cavity of the fluid flow regulator and configured to at least partially cover the regulator rebound orifice, and wherein the means for covering the regulator rebound orifice is configured to
allow fluid to flow from a fluid chamber within the shock absorber that is external to the fluid flow regulator, through the regulator rebound orifice, and into the single interior cavity of the fluid flow regulator when the shock absorber is undergoing rebound, and
substantially block fluid from flowing from the single interior cavity, through the regulator rebound orifice, and into the fluid chamber when the shock absorber is undergoing compression; and
means for covering the regulator compression orifice, the means for covering the regulator compression orifice positioned externally to the fluid flow regulator and configured to at least partially cover the regulator compression orifice, and wherein the means for covering the regulator compression orifice is configured to
allow fluid to flow from the single interior cavity, through the regulator compression orifice, and into the fluid chamber when the shock absorber is undergoing compression, and
substantially block fluid from flowing from the fluid chamber, through the regulator compression orifice, and into the single interior cavity when the shock absorber is undergoing rebound.

22. The fluid flow regulator of claim 21, wherein the means for covering the regulator compression orifice is adjustable to change a compression resistance characteristic of the shock absorber, and the means for covering the regulator rebound orifice is adjustable to change a rebound resistance characteristic of the shock absorber.

23. The fluid flow regulator of claim 21, wherein the means for covering the regulator rebound orifice is positioned in between an inner surface of the cover plate and a top portion of a central support structure of the main body, the inner surface of the cover plate facing the single interior cavity, the means for covering the regulator rebound orifice further positioned against the inner surface of the cover plate, and wherein the means for covering the regulator compression orifice is positioned against the bottom of the main body.

* * * * *